(12) United States Patent
Gao et al.

(10) Patent No.: US 11,961,150 B2
(45) Date of Patent: Apr. 16, 2024

(54) NATIONAL FOREST RESOURCES CONTINUOUS INVENTORY CLOUD PLATFORM AND SAMPLE PLOT MONITORING METHOD

(71) Applicants: Sichuan Forestry and Grassland Investigation and Planning Institute, Sichuan (CN); Sichuan Yangdi Shikong Technology Co., Ltd, Sichuan (CN)

(72) Inventors: Fei Gao, Sichuan (CN); Zhifang Zhu, Sichuan (CN); Nana Li, Sichuan (CN)

(73) Assignees: Sichuan Forestry and Grassland Investigation and Planning Institute, Chengdu (CN); Sichuan Yangdi Shikong Technology Co., Ltd, Chengdu (CN)

( * ) Notice: Subject to any disclaimer, the term of this patent is extended or adjusted under 35 U.S.C. 154(b) by 0 days.

(21) Appl. No.: 18/203,646

(22) Filed: May 31, 2023

(65) Prior Publication Data
US 2024/0004864 A1    Jan. 4, 2024

(30) Foreign Application Priority Data
Jun. 30, 2022    (CN) .......................... 202210755800.9

(51) Int. Cl.
*G06Q 50/02* (2012.01)
*G06F 16/22* (2019.01)
(Continued)

(52) U.S. Cl.
CPC ......... *G06Q 50/02* (2013.01); *G06F 16/2282* (2019.01); *G06F 16/2365* (2019.01); *G06Q 10/0631* (2013.01)

(58) Field of Classification Search
CPC ............ G06F 16/2365; G06F 16/2282; G06Q 10/0631; G06Q 50/02
(Continued)

(56) References Cited

U.S. PATENT DOCUMENTS

2014/0163781 A1 *    6/2014    Vian ..................... G01S 7/4802
701/3

FOREIGN PATENT DOCUMENTS

CN         201562310 U      8/2010
CN         103869374 A      6/2014
(Continued)

OTHER PUBLICATIONS

Brodbeck, et al Timber Mapping for Site-Specific Forest Management, ASABE Annual International Meeting, Minneapolis (2007) (Year: 2007).*
(Continued)

*Primary Examiner* — Charles Guiliano

(57) ABSTRACT

The present invention relates to a national forest resources continuous inventory cloud platform and sample plot monitoring method. The cloud platform includes a perception layer, a network layer, a platform layer, a data layer, an application layer, and a user layer. The national forest resources continuous inventory cloud platform is run by steps of inventory sample plot restoration and device arrangement, automatic collection of inventory sample plot data, dynamic monitoring and management of inventory sample plots, summarization and statistical analysis of data, and visualization of achievement evaluation, so as to replace the manual monitoring with automatic monitoring, change the organization mode of the national forest resources continuous inventory, and replace the investigation at fixed intervals with real-time monitoring, realize the continuous inventory and real-time monitoring of national forest
(Continued)

resources, reduce the organization difficulty, survey risk and technical requirements of forest sample survey.

10 Claims, 11 Drawing Sheets

(51) Int. Cl.
 *G06F 16/23* (2019.01)
 *G06Q 10/0631* (2023.01)
(58) Field of Classification Search
 USPC .............................................. 705/7.11, 7.12
 See application file for complete search history.

(56) References Cited

FOREIGN PATENT DOCUMENTS

| CN | 104184785 A | 12/2014 |
|---|---|---|
| CN | 104636906 A | 5/2015 |
| CN | 105389936 A | 3/2016 |
| CN | 106850666 A | 6/2017 |
| CN | 108111217 A | 6/2018 |
| CN | 108982792 A | 12/2018 |
| CN | 111444774 A | 7/2020 |
| CN | 113156394 A | 7/2021 |
| CN | 113310534 A | 8/2021 |
| CN | 113324785 A | 8/2021 |

OTHER PUBLICATIONS

Tremblay, et al., Automatic Three-Dimensional Mapping for Tree Diameter Measurements in Inventory Operations 37 Journal of Field Robotics 8 (2020) (Year: 2020).*
1st Office Action of counterpart Chinese Patent Application No. 202210755800.9 dated Aug. 12, 2022.
Notice of Allowance of counterpart Chinese Patent Application No. 202210755800.9 dated Sep. 27, 2022.
Zhiguo Xue, Research on Forest Resource Information Management and Information System Construction, Modern Horticulture, 2019, pp. 179-180, No. 13.
Zahida Najmi et al., Forest Inventory Parameters from Lidar Radar and Optical Data: Case Study Lubrecht Experimental Forest in California, 2019 Sixth International Conference on Aerospace Science and Engineering (ICASE), Apr. 9, 2020, pp. 1-6.
Julián Tomaštík et al., Tango in forests—An initial experience of the use of the new Google technology in connection with forest inventory tasks, Computers and Electronics in Agriculture, 2017, pp. 109-117, vol. 141.

* cited by examiner

NATIONAL FOREST RESOURCES CONTINUOUS INVENTORY CLOUD PLATFORM AND SAMPLE PLOT MONITORING METHOD

CROSS REFERENCE TO RELATED APPLICATIONS

The present application claims the benefit of Chinese Patent Application No. 202210755800.9 filed on Jun. 30, 2022, the contents of which are incorporated herein by reference in their entirety.

FIELD OF THE INVENTION

The present invention belongs to the technical field of Internet of Things and geographic spatial data collection, computing and processing, in particular to a national forest resources continuous inventory cloud platform and sample plot monitoring method.

BACKGROUND OF THE INVENTION

National forest resources continuous inventory is highest-level macro forest resources survey and surveillance in a forest resources survey system, and implements retest and survey on fixed sample plots by a sampling survey method. Survey data are analyzed by principles and methods of mathematical statistics, in which various types of areas are estimated by a percentage sampling method, various types of stocks are estimated by a systematic sampling method, and growth and consumption are computed by restoration sample trees. Through repeated and comparative survey of fixed sample plots, comprehensive information about land use and cover, forest resources and ecological status is obtained, so as to provide objective and accurate basic data of forest resources for mastering macro information such as status and growth and decline dynamics of forest resources at a national level.

At present, the national forest resources continuous inventory has been incorporated into national forest, grassland, and wetland survey and surveillance, is named as forest sample plot survey, and serves as an important part of the national forest, grassland, and wetland survey and surveillance. Original national forest resources continuous inventory is carried out every five years. At present, forest sample plot survey still uses national forest resources continuous inventory fixed sample plots. An annual survey quantity is ⅕ of total sample plots, and remaining ⅘ sample plots with obvious changes in remote sensing interpretation ensure that a round of survey is completed in 5 years for fixed sample plots in national forest resources continuous inventory, where the survey method still involves manual sample plot restoration and sample tree measurement, and mainly has the following shortcomings:

(1) The interval is long, and annual data output requirements cannot be really met. There are 415,000 fixed sample plots in China. Due to huge workload, the national forest resources continuous inventory can only be completed once every five years. Only methods such as joint estimation can be used to count and compute total forest resources data of the whole country and provinces (autonomous regions and municipalities) in China, such as forest area, forest coverage, forest stock, forest stock per unit area, and growth per unit area. Therefore, annual data output cannot be really implemented, and requirements of the government and society for dynamic monitoring of forest resources cannot be met.

(2) Survey input is large, and organization and guarantee are difficult. There are 415,000 fixed sample plots in China, which are arranged by systematic sampling. Investigators are required to arrive at measured sample plots for measurement. The national forest resources continuous inventory needs to consume a lot of manpower and material resources from organization, training, trial production, production, inspection, summarization, and achievement statistics. The national work organization and guarantee input is huge. If annual monitoring is implemented, organization and guarantee are relatively difficult.

(3) The survey is hard and dangerous. The national forest resources continuous inventory employs systematic sampling arrangement, and some of the inventory sample plots are in no man's land. In addition, the measured sample plots require manual restoration and sample tree measurement on site, so investigators have to complete their tasks in danger, which is hard and dangerous.

(4) High survey technology and quality are required. The survey integrates knowledge of geomatics, ecology, forest management, and the like. There are 14 survey record charts and more than 200 filling factors in one inventory sample plot. With upgrade of technical means, investigators also need to use mobile data collection software skillfully. The survey requires investigators not only to have good skills, but also to have excellent physical quality and strong will to complete their work.

(5) Control on survey quality is difficult. Due to investigator quality and objective circumstances, there will be deviations in the survey, such as failure in sample tree restoration, wrong measurement, and missing measurement, which affect accuracy of survey achievements. Because of sampling inspection, comprehensive quality inspection cannot be implemented. Some investigators have a fluke mind to start survey before arriving at an inventory sample plot, or even fabricate data completely indoors, which makes it difficult to control the survey quality.

(6) Survey and quality inspection are repeated. Sample plot restoration, sample tree restoration, and tally are the main work of inventory survey. In practical work, most of the inventory sample plots exist and grow stably and continuously, only a few advancing trees change, but sample plot restoration, sample tree restoration, and tally are still repeated. In addition, the quality inspection also requires sample plot restoration, sample tree restoration, and tally for drawn inventory sample plots. Therefore, there is much repetitive work in survey and quality inspection.

(7) Change information of inventory sample plots cannot be grasped in time. Whether an inventory sample plot has changed can be found only when investigators survey the inventory sample plot again, so the survey cannot obtain reasons and time of changes of inventory sample plots in time.

To sum up, it is urgent to provide a national forest resources continuous inventory cloud platform and sample plot monitoring method, which have high monitoring accuracy and timeliness, greatly reduce work organization, quality control, technical requirements, and production safety risk, and can grasp change information of inventory sample plots in time.

SUMMARY OF THE INVENTION

An objective of the present invention is to provide a national forest resources continuous inventory cloud platform and sample plot monitoring method, which have high monitoring accuracy and timeliness, can greatly reduce work organization, quality control, technical requirements, and production safety risk, and can grasp change information of inventory sample plots in time.

The foregoing objective is implemented by the following technical solution: A national forest resources continuous inventory cloud platform includes:

- a perception layer, configured to collect and obtain types and radial growth of sample trees and temperature and humidity environmental factors of an inventory sample plot, store and transmit collected information to a network layer, and configure and manage devices on the perception layer and a network layer;
- the network layer, configured to arrange a communication relay apparatus in the inventory sample plot, gather data collected by the perception layer, and transmit the data to a platform layer; the platform layer, configured to provide computing, storage and network resources for the national forest resources continuous inventory cloud platform, and perform unified management through a virtualization management platform;
- a data layer, configured to store and manage the data collected by the perception layer, complete data processing and summarization, and publish the data as map services through the platform layer to implement data sharing;
- an application layer, configured to manage devices and the data collected by the perception layer, and provide the user layer with dynamic monitoring of the inventory sample plot and devices, maintenance and update of facilities and devices, and evaluation, sharing, and visualization services of monitoring achievements, wherein
- the user layer, configured to carry out first restoration survey and device arrangement for the inventory sample plot, patrol tasks and device maintenance for the inventory sample plot during a monitoring period, and dynamic monitoring, evaluation, assessment, and research of forest resources;

In a further technical solution, the perception layer includes a tree diameter measuring sensor, an environmental sensor, a tilt sensor and a data collection terminal, where the data collection terminal is configured for the user layer to complete data collection and device management, information communication, and patrol, maintenance and management of the inventory sample plot and perception terminal devices, and the network layer includes a communication relay device, a communication base station, a communication receiving apparatus, and a device for completing optical fiber communication and Internet transmission.

In a further technical solution, the application layer includes:

- a mobile data collection system, configured to obtain server side information, connect to the communication relay apparatus and the tree diameter measuring sensor on survey site for restoration of sample trees on the inventory sample plot and collection, input and computing of data, configure and manage the communication relay apparatus and the tree diameter measuring sensor on site, receive device maintenance information by patrol personnel, survey changes of the inventory sample plot, and update devices, where the mobile data collection system is deployed on the data collection terminal;
- a data summarization, statistical analysis and management system, configured to summarize and count inventory sample plot data that are surveyed and collected by the data collection terminal and automatically collected by monitoring devices, check a logical relationship between survey cards, analyze overall sampling accuracy, count achievement reports, and provide survey form templates that the mobile data collection system need to download and related data table configuration functions;
- a dynamic monitoring management system, configured to supervise statuses of communication relay apparatuses and tree diameter measuring sensors arranged in all inventory sample plots, establish a grid management system for investigators and forest rangers, carry out patrol tasks for inventory sample plots, and confirm device maintenance and update results; and
- an achievement evaluation visualization system, configured to carry out forest resources monitoring, ecosystem evaluation and index assessment, and provide visual data display and sharing services based on basic data and evaluation results.

In a further technical solution, the mobile data collection system includes:

- a user login module, configured to log in to the mobile data collection system;
- a map operation and positioning, navigation, track, and photographing module, configured to provide a user with interactive modes based on map operations, and provide basic map operation functions of translation, zoom-in, zoom-out, and hierarchical display, and advanced map operation functions including positioning, navigation, track collection, and photographing;
- an inventory sample plot and sample tree survey data download module, configured to download survey forms including sample plot cards of previous national forest resources continuous inventory, an inventory sample plot database, and field survey record forms, as well as basic data and tables including satellite remote sensing images, inventory technical rules, dominant tree species maps, and unitary volume tables;
- an inventory sample plot and sample tree card factor input module, configured to input basic information of the inventory sample plot, sample plot positioning and arrangement, survey records of sample plot factors, measured maps of fixed sample trees, tree height measurement records, forest disaster survey records, vegetation survey records, underwood survey records, natural regeneration survey records, sample plot change survey records during a review period, unformed afforestation land survey records, bamboo scale record charts, miscellaneous bamboo sample survey record charts, economic tree species survey record charts, and track photo recorded information;
- a mobile communication and Beidou satellite signal test module, configured to measure types of mobile signals on site, select communication relay, test strengths of mobile signals or Beidou signals, and test a success rate of data transmission by communicating with a communication receiving end;

a communication relay apparatus connection, test and configuration module, configured to connect to the communication relay apparatus by using the data collection terminal, set a data collection frequency, determine start time and start duration of the communication relay apparatus and the tree diameter measuring sensor, and estimate a theoretical monitoring time length according to a data collection frequency set by the user and battery capacity;

a tree diameter measuring sensor connection and data input module, configured to connect to the tree diameter measuring sensor by using the data collection terminal, and after confirming the correct connection, input information of a surveyed sample tree, such as a sample tree number, a standing tree type, a tally type, a tree species name, a tree species code, an early diameter at breast height, a forest layer, a cross-angle land type serial number, an azimuth angle, and a horizontal distance;

a tree diameter measuring sensor and communication relay apparatus data transmission module, configured to trigger background communication events of the tree diameter measuring sensor and the communication relay apparatus after the information of the surveyed sample tree is input, where the tree diameter measuring sensor transmits the device number and the survey input sample tree information through the wireless communication module to the communication relay apparatus for storage;

an inventory sample plot measured survey data viewing and checking module, configured to, after survey of all sample trees is completed, connect to the communication relay apparatus by using the data collection terminal, obtain all tree diameter sensor data stored in the communication relay apparatus to the data collection terminal, compare the tree diameter sensor data with previous survey and surveillance data, check whether there are missing data, check abnormal change data, and check whether the tree diameter measuring sensor currently installed has low battery capacity;

an inventory sample plot patrol task receiving module, configured to, when receiving an inventory sample plot patrol task issued by a provincial or national user, view patrol task information including the number of a patrolled inventory sample plot and main patrol content, submit patrol task personnel and a time schedule after acknowledgment, and receive provincial or national task completion acknowledgment information after patrol; and an inventory sample plot patrol result feedback module, configured to fill in patrol task completion after the inventory sample plot is patrolled on site, fill in update information factors for a device to be updated, or retest the inventory sample plot and arrange monitoring devices, and provide on-site patrol results and photos.

In a further technical solution, the data summarization, statistical analysis and management system includes:

a user login module, configured to log in to the data summarization, statistical analysis and management system;

a survey form and basic data table configuration module, configured to configure the survey forms including sample plot cards of previous national forest resources continuous inventory, an inventory sample plot database, and field survey record forms, as well as the basic data and tables including satellite remote sensing images, inventory technical rules, dominant tree species maps, and unitary volume tables;

an inventory sample plot survey data summarization module, configured to summarize tree diameter measuring sensor data returned by each communication relay apparatus through a receiving apparatus, and compute measured survey results of the inventory sample plot; an inventory sample plot survey card logical check module, configured to check a logical relationship between survey factors in national forest resources continuous inventory sample plot cards, including required item check, non-filling item check, dictionary item check, and logical relationship check;

an overall sampling accuracy and eigenvalue computing module, configured to count and generate overall sampling accuracy and eigenvalues of each monitored object, where the overall sampling accuracy and eigenvalues include at least a quantity of sample units, an average quantity of samples, variation coefficients, sampling accuracy, an estimated median value, an estimated interval, a sample plot restoration rate, and a sample tree restoration rate;

an inventory sample plot measured result computing module, configured to compute measured survey results of a standard plot after tally data of the inventory sample plot are obtained; and an inventory achievement report statistics module, configured to generate a statistical table of national forest resources continuous inventory achievements.

In a further technical solution, the dynamic monitoring management system includes:

a user login module, configured to log in to the dynamic monitoring management system;

a device and status management module for communication relay apparatuses, configured to inquire information of a communication relay apparatus, check an operating status of the communication relay apparatus, and configure a monitoring frequency, wake-up time and wake-up duration for the communication relay apparatus;

a device and status management module for tree diameter measuring sensors, configured to inquire device information of a tree diameter measuring sensor, check an operating status of the tree diameter measuring sensor, and configure wake-up time and wake-up duration for the tree diameter measuring sensor;

an investigator and forest ranger management module, configured to establish and manage accounts and permissions of investigators and forest rangers, delimit and divide management and protection grids for the investigators and the forest rangers, and establish a cooperative relationship between the investigators and the forest rangers;

an inventory sample plot patrol task distribution module, configured to discover loss of device statuses, determine a device fault inventory sample plot, find investigators and forest rangers who maintain the device fault inventory sample plot, initiate a device maintenance task, send the number and loss information of a status lost device to data collection terminals of the investigators and the forest rangers, and view a task progress in real time; and an inventory sample plot patrol result acknowledgment and update module, configured to receive and summarize task reception and completion of the investigators and the forest rangers, and terminate the device maintenance task after completing the maintenance.

In a further technical solution, the achievement evaluation visualization system includes:
- a user login module, configured to log in to the achievement evaluation visualization system;
- a forest resources evaluation module, configured to generate a forest area, a forest stock, a forest structure and dynamic changes thereof according to the inventory sample plot survey and summarization results, and evaluate the forest area and quality changes;
- an ecosystem evaluation module, configured to generate a series of ecological evaluation indexes and indicators based on a model knowledge base;
- a key region evaluation module, configured to comprehensively evaluate a status, quality, carbon sink, and functional benefits of an ecosystem in a national key strategy and social key concern region;
- a three-dimensional real map visualization module, configured to display national or provincial national forest resources continuous inventory achievement data in a big data visualization manner by using a three-dimensional real map and other interaction modes, and carry out comparative analysis and prediction analysis on the data for a long time series; and
- a topic achievement data sharing module, configured to display data resources, services and applications owned and produced by the national forest resources continuous inventory cloud platform.

In order to achieve the foregoing objective, the present invention further provides a national forest resources continuous inventory sample plot monitoring method, executed by any of the foregoing national forest resources continuous inventory cloud platforms, and including the following steps:
(1) inventory sample plot restoration and device arrangement: completing sample plot restoration and sample tree retest for an inventory sample plot, and arranging devices on the perception layer and the network layer;
(2) automatic collection of inventory sample plot data: returning data at a set monitoring frequency by the devices on the perception layer in the inventory sample plot, and parsing and storing the collected data by the platform layer;
(3) determining, according to the automatically collected data information, whether the perception layer and the inventory sample plot change, and if so, entering step (4), otherwise entering step (5);
(4) dynamic monitoring and management of the inventory sample plots: issuing a sample plot patrol task, confirming device maintenance and update results, keeping continuous monitoring on the inventory sample plot, and entering step (5);
(5) summarization and statistical analysis of data: summarizing survey data of sample trees in inventory sample plots, checking data logic and overall sampling accuracy, counting important index information of each inventory sample plot and monitored objects during a monitoring period, and generating achievement statistics reports;
(6) visualization of achievement evaluation: building a model knowledge base, carrying out forest resources evaluation, ecosystem evaluation and key region evaluation, and providing visual data display and sharing services; and
(7) determining whether the monitoring is finished, and if so, terminating the process, otherwise executing step (2) to carry out continuous monitoring.

In a further technical solution, specific operation steps in step (1) are as follows:
(1.1) after arriving at the inventory sample plot, completing the sample plot restoration, and testing a local signal by the data collection terminal to determine a type of a communication relay apparatus;
(1.2) arranging the communication relay apparatus at a central position of the sample plot, testing a connected status, and keeping the communication relay apparatus in a turn-on status after the connection succeeds;
(1.3) connecting the data collection terminal to the communication relay apparatus, setting a data collection frequency, and determining start time and start duration of the communication relay apparatus and a tree diameter measuring sensor;
(1.4) selecting a sample tree diameter measuring position and fixing the tree diameter measuring sensor to the sample tree to be measured;
(1.5) starting the tree diameter measuring sensor and connecting the data collection terminal to the tree diameter measuring sensor;
(1.6) pulling a pull rope out from a pull wire outlet of the tree diameter measuring sensor, and buckling the pull rope into an anti-dismantle pull wire fixing port after winding the sample tree for one circle;
(1.7) checking whether a measured value about the diameter of the sample tree is shown in the data collection terminal, and if no measured value is shown, pressing a start button of the tree diameter measuring sensor to ensure that the pull rope is pulled again for mounting in a start status;
(1.8) clicking to connect the tree diameter measuring sensor, and inputting a tree species and a tally type;
(1.9) implementing communication between the tree diameter measuring sensor and the communication relay apparatus, to transmit input tally and battery capacity information to the communication relay apparatus for storage;
(1.10) performing clock synchronization on the tree diameter measuring sensor and the communication relay apparatus, and obtaining start time and start duration of the tree diameter measuring sensor;
(1.11) enabling the tree diameter measuring sensor that is not in communication connection to automatically enter a dormant status after a fixed interval;
(1.12) repeating steps (1.4-1.11) to complete mounting of tallies and tree diameter measuring sensors for all sample trees in the inventory sample plot;
(1.13) returning, by the communication relay apparatus, the stored information to the communication receiving apparatus through the base station, and summarizing the information into a network server on the platform layer; and
(1.14) disconnecting the data collection terminal and the communication relay apparatus, and enabling the communication relay apparatus to automatically enter a dormant status after a fixed interval.

In a further technical solution, specific operation steps in step (2) are as follows:
(2.1) regularly starting the communication relay apparatus according to a set wake-up time, and accessing the network server on the server side through the base station, to obtain next wake-up time and wake-up duration;
(2.2) regularly starting the tree diameter measuring sensor according to a set wake-up time, and measuring the measured sample tree to obtain a measured diameter value and a tilt sensor value;

(2.3) if the tilt sensor value exceeds a specified threshold, determining that the current sample tree is a fallen tree, and updating the tally type to be a fallen tree;

(2.4) reading diameter changes of the sample tree in a continuous period, and updating the tally type to be a dead standing tree when the diameter of the sample tree is constant or regularly reduced beyond a predetermined interval;

(2.5) connecting the tree diameter measuring sensor with the communication relay apparatus to transmit information about the diameter of the standing tree, a type of the standing tree, and battery capacity;

(2.6) performing clock synchronization on the tree diameter measuring sensor and the communication relay apparatus to obtain next wake-up time and wake-up duration, and entering a dormant status after success;

(2.7) receiving, by the communication value relay apparatus, data from the tree diameter measuring sensor for storing, computing a difference from the previous measured data, and returning a difference result according to a coding order of the tree diameter measuring sensor; and (2.8) returning, by the communication relay apparatus, the stored information to the communication receiving apparatus through the base station, and summarizing the information into the network server on the platform layer.

In a further technical solution, specific operation steps in step (4) are as follows:

(4.1) completing identity verification of a user in a competent authority on the user layer for login;

(4.2) designating investigators and forest rangers for all inventory sample plots;

(4.3) obtaining working statuses of the communication relay apparatuses arranged in all the inventory sample plots within the last wake-up time period;

(4.4) checking whether the statuses of all the communication relay apparatuses are normal, and if so, executing step (4.11), otherwise executing step (4.5);

(4.5) issuing a patrol task to a forest ranger in a region where the status of the communication relay apparatus is abnormal, to require on-site verification on the status of the inventory sample plot;

(4.6) receiving patrolled inventory sample plot objects and arriving at a designated sample plot by the forest ranger;

(4.7) feeding back, by the forest ranger, site conditions of the designated inventory sample plot;

(4.8) determining, according to the feedback information in step (4.7), whether an investigator needs to be dispatched to update devices or resurvey, and if so, executing step (4.9), otherwise executing step (4.10);

(4.9) carrying a communication relay apparatus and a tree diameter measuring sensor by the investigator to the inventory sample plot, resurveying the sample plot according to step (1), and returning new data;

(4.10) determining a current status of the inventory sample plot according to the returned data, and updating sample plot and sample tree information;

(4.11) obtaining working statuses of tree diameter measuring sensors and tilt sensors arranged in all the inventory sample plots within the last wake-up time period;

(4.12) determining whether the statuses of all the tree diameter measuring sensors and tilt sensors are normal, and if so, executing step (4.13), otherwise executing step (4.5); and (4.13) reading diameter changes of the sample tree in two successive periods, and comparing whether a difference change exceeds a normal growth range of diameter growth rates of standing trees, and if so, determining that the current data are abnormal, and executing step (4.5), otherwise terminating the process.

In a further technical solution, specific operation steps in step (5) are as follows:

(5.1) logging in to complete identity verification of a user;

(5.2) using configured survey form templates and basic data tables to store previous inventory sample plot cards for downloading and use by the mobile data collection system;

(5.3) summarizing the survey information received by the network server on the platform layer;

(5.4) logically checking the recorded information summarized into the sample plot survey achievement database, determining whether there is a logical error, and if there is, notifying an error survey unit to make corrections, and submitting the corrected information again by using the mobile data collection system until there is no logic error;

(5.5) computing measured result data of each inventory sample plot according to tree species and an unitary volume table;

(5.6) counting sampling accuracy and eigenvalues of monitored objects of current national forest resources continuous inventory, interpreting whether the sampling accuracy meets requirements, and if the sampling accuracy does not meet the requirements, notifying the survey unit to make corrections, and submitting the corrected sampling accuracy again by using the mobile data collection system until the accuracy requirements are met; and (5.7) computing and generating important index information of each inventory sample plot and monitored objects during a monitoring period, and generating achievement statistics reports.

In a further technical solution, specific operation steps in step (6) are as follows:

(6.1) logging in to complete identity verification of a user;

(6.2) selecting any monitoring year or monitoring years for comparative analysis;

(6.3) evaluating ecological functions and dynamic changes of a forest by using landscape ecology and process mechanism model methodology;

(6.4) selecting an analysis region through administrative division selection, interactive map selection, and custom ecological function region selection, and carrying out forest resources evaluation and ecosystem evaluation;

(6.5) displaying continuous inventory achievement data in a big data visualization manner by using a three-dimensional real map and other interaction modes, and carrying out comparative analysis and prediction analysis on the data for a long time series; and (6.6) displaying data resources, services and applications owned by the platform according to different types and different permissions, and accessing a resource center in a browser or a mobile terminal by a user to obtain and make topic map resources and implement data sharing and exchange.

Compared with the prior art, the present invention puts forward a national forest resources continuous inventory cloud platform, provides a system framework of the national forest resources continuous inventory cloud platform, and describes components of the national forest resources continuous inventory cloud platform in detail. On this basis, a national forest resources continuous inventory sample plot monitoring method is put forward. The national forest resources continuous inventory cloud platform is run by five steps: inventory sample plot restoration and device arrangement, automatic collection of inventory sample plot data, dynamic monitoring and management of inventory sample plots, summarization and statistical analysis of data, and visualization of achievement evaluation, so as to replace manual monitoring with automatic monitoring, change the organization mode of the national forest resources continuous inventory, and replace the investigation at fixed intervals with real-time monitoring, realize global, all-weather, real-time and continuous monitoring of the national forest resources continuous inventory, and achieve the following advantages:

Annual output is really achieved, and even a requirement of daily output is met. A tree diameter measuring sensor is used instead of a manual ruler in the sample plot restoration, so as to change a monitoring period of the national forest resources continuous inventory from current 5 years to be determined by the electric quantity of the tree diameter measuring sensor while increasing measurement accuracy. Arranging once, measuring once a day, returning once every seven days, continuous monitoring for 10 years, and annual output or daily output can be really implemented under current conditions.

The organization mode is changed, and the organization difficulty and guarantee are greatly reduced. Original one-time and moving surface survey is changed into point survey aiming at issues and changes in the present invention, to achieve "surveying a changing place". Because a quantity of "unchanged" inventory sample plots that grow stably in national forest resources continuous inventory sample plots is far greater than that of "changed" inventory sample plots in subversive transformation, workloads are greatly reduced, and only a small quantity of professional teams are needed to maintain the whole survey system, thereby greatly reducing the organization difficulty and guarantee.

Survey risk is reduced. For stably changing inventory sample plots that are often sparsely populated and in poor conditions, manual monitoring is replaced with automatic monitoring, and manual on-site measurement is not needed. Frequently changing inventory sample plots are mostly located in regions with frequent human activities and convenient traffic conditions, so maintenance costs of the sample plots are low, and overall survey risk is greatly reduced.

High technical requirements of forest sample survey is reduced. Except that the completely destroyed sample plots need to be resurveyed, the remaining inventory sample plots are automatically monitored, not manually monitored, and on-site measurement is not needed, thereby greatly reducing the technical requirements of forest sample survey.

Difficulty in controlling survey quality is greatly reduced. In the restoration of an inventory sample plot where a tree diameter measuring sensor is deployed for the first time, deviations such as wrong measurement and missing measurement are reduced by using the tree diameter measuring sensor. Because return of data of sample trees in the sample plot can be monitored through a network, data fabrication by investigators who are not on site is eliminated, and the difficulty in controlling survey quality is greatly reduced.

Repeated survey and quality inspection are reduced. Sample plot restoration, sample tree restoration, and tally are the main work of inventory. The tree diameter measuring sensor is used for monitoring instead of sample tree restoration and tally. The sample tree restoration and tally are also avoided for quality inspection, and the quality inspection focuses on other factors, so working time and tasks of the quality inspection are greatly reduced.

Changes of sample plots are discovered in time, and change reasons and change time of forest resources are learned. The national forest resources continuous inventory cloud platform can return data weekly, so changes of national or provincial sample plots can be determined within one week, reasons for the changes of sample plots can be determined by nearest forest rangers, and changes, change reasons and change time of forest resources can be monitored in real time.

Global data monitoring is implemented. The Beidou short message communication relay apparatus make up for a problem of data transmission in the absence of mobile communication signals, and can implement global and all-weather forest resources monitoring.

BRIEF DESCRIPTION OF THE DRAWINGS

The accompanying drawing constituting a part of the present invention is used for providing a further understanding of the present invention, and the schematic embodiments of the present invention and the descriptions thereof are used for interpreting the present invention, rather than constituting improper limitations to the present invention.

DETAILED DESCRIPTION OF THE EMBODIMENTS

The present invention is described in detail below with reference to the accompanying drawings. The description in this section is merely exemplary and explanatory, and should not have any limitation to the protection scope of the present invention. In addition, those skilled in the art may combine features in embodiments herein and in different embodiments according to the description herein.

Figure 1:
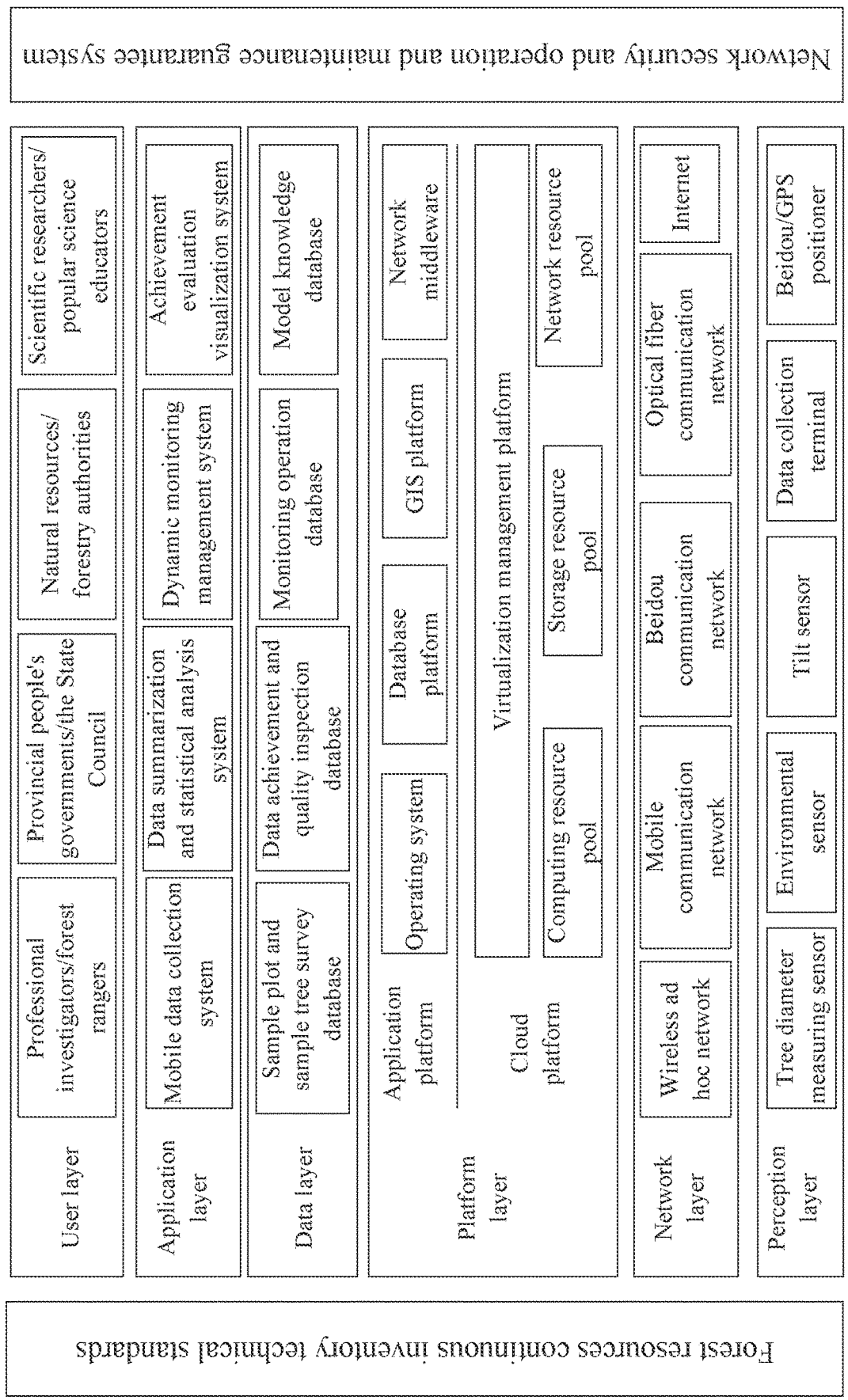
FIG. 1 is a system framework diagram of a national forest resources continuous inventory cloud platform according to an embodiment of the present invention.

An embodiment of the present invention is shown as follows. With reference to FIG. 1, a national forest resources continuous inventory cloud platform includes a perception layer, a network layer, a platform layer, a data layer, an application layer and a user layer, and is linked with and supports national forest resources continuous inventory monitoring technical standards and a network security and operation and maintenance guarantee system mutually to form a closed-loop operation system.

The perception layer is configured for data collection, and includes a tree diameter measuring sensor, an environmental sensor, tilt sensors and a data collection terminal. The tree diameter measuring sensor replaces a diameter tape or a vernier caliper to measure radial growth of a sample tree in real time. The tree diameter measuring sensor device includes pull wire gears (a first gear and a second gear that engage with each other), an anti-dismantle pull wire fixing port, a single-turn absolute value encoder, a printed circuit board (PCB), a battery and a button switch. In use, the first gear is driven to rotate by pulling a pull wire, and the second gear rotates accordingly and drives the single-turn absolute value encoder to count, collected signals are connected to the PCB for computing, and the pull wire is buckled into the anti-dismantle pull wire fixing port after winding a trunk for one turn. A power supply in the tree diameter sensor is fixed above the PCB and connected through a power supply interface on the PCB. The button switch is fixed on an inner side of a lower end of a data sensor and connected to the PCB to control start of the power supply and wake-up of a circuit.

The environmental sensor is equipped with environmental monitoring chips for temperature, humidity, air pressure, and light, and further includes electrochemical gas monitoring chips for carbon dioxide, carbon monoxide, and methane. The environmental sensor may be deployed independently, is connected to the tree diameter measuring sensor through a wireless communication interface such as WIFI/Bluetooth/LORA, and may also be integrated with a communication relay apparatus. Only one environmental sensor is needed for each inventory sample plot, and indicators monitored by the environmental sensor are configured according to actual survey and research needs.

The tilt sensors are integrated into the tree diameter measuring sensor and the communication relay apparatus respectively to monitor a lodging change status of a sample tree, and may also be combined with acceleration sensors to monitor whether devices are damaged.

The data collection terminal includes, but is not limited to terminal devices with storage, computing and network communication capabilities, such as a PDA, a tablet, a tablet computer, and a mobile phone. A mobile data collection system is deployed on the data collection terminal, and is configured for investigators to complete data collection and device management, as well as information communication of forest rangers, and patrol, maintenance and management of devices in an inventory sample plot and a perception terminal.

The network layer is configured for data transmission, and includes a communication relay apparatus, a satellite/mobile communication base station, a communication receiving apparatus, and a device for completing optical fiber communication and Internet transmission.

The communication relay apparatus is implemented by using a technology of "Dual-Mode Communication System and Communication Method Based on Wireless Ad Hoc Network and Beidou RDSS Technology" (patent number: CN201711330802.9), and mainly includes a wireless communication unit, a signal transmitting and receiving unit, a battery, a sensor, and a shell. The wireless communication unit implements wireless connection of each tree diameter measuring sensor within a scope of an inventory sample plot, where a wireless transmission protocol includes, but is not limited to, WIFI, Bluetooth, Lora, NB-IOT, and Zigbee. The signal transmitting and receiving unit implements a connection between the communication relay apparatus and the communication receiving apparatus. According to different communication modes of the signal transmitting unit, the communication relay apparatus is classified into two types: a Beidou short message communication relay apparatus and a mobile communication relay apparatus. The signal transmitting unit of the mobile communication relay apparatus is a mobile operator network card module, including but not limited to an NB-IOT module, a GPRS module, a 3G module, a 4G module, and a 5G module. Data are summarized into a communication server of the communication receiving apparatus by using a mobile communication network of a telecommunication operator to access a network server. The signal transmitting and receiving unit of the Beidou communication relay apparatus is a Beidou RDSS transceiver antenna module, which returns data to a Beidou directing device in the communication receiving apparatus through a Beidou satellite to access the network server.

The satellite receives Beidou short message communication relay transposition information and forwards the same to a Beidou short message communication receiver. After receiving the mobile communication relay transposition information, a mobile communication base station device returns the information to the communication server by using the mobile operator communication network.

The communication receiving apparatus includes a communication server and a Beidou directing device, where the communication server receives data transmitted by the communication network of the mobile operator, and the Beidou directing device receives service functions transmitted by the Beidou satellite, such as short message communication, announcement call, and monitoring.

The optical fiber communication and Internet transmission device transmit data of the communication receiving apparatus to the cloud platform through optical fiber communication for computing and storage, and access the Internet to implement data sharing. Related devices include network cables, optical fibers, a concentrator, a switch, a router, and a firewall device. This part employs existing mature technologies, and details are not repeated here.

The platform layer provides platform software and hardware support, and includes a cloud platform and an application platform. The cloud platform includes, but is not limited to, an X86 computing server for building a computing resource pool, a storage server for building a storage resource pool, a network server and a gateway for building a network resource pool, and virtualization platform software for resource virtualization management. The application platform includes an operating system, a database platform, a GIS platform, and network middleware that are deployed on a virtualization platform. This part employs existing mature technologies, and details are not repeated here.

The data layer completes data storage, processing, summary, display, and the like, and is built by using an enterprise-level geospatial database, where a sample plot and sample tree survey database stores data of previous national forest resources continuous inventory questionnaires, and real-time monitored data collected and transmitted by the perception layer and the network layer. A data achievement and quality inspection database stores provincial and national summary, statistics, and computation achievement data, and quality inspection questionnaire data. A monitoring operation database stores operating statuses of the tree diameter measuring sensor and the communication relay apparatus, device fault processing data, and management information such as personnel information, roles, and permissions of investigators, forest rangers, and management users. A model knowledge base stores unitary volume tables, models of ecological function value evaluation and comprehensive evaluation of an ecological system, and basic data tables, which are needed for survey and computing.

The application layer provides a user with application system services, as shown in FIG. 1, including a mobile data collection system, a data summarization and statistical analysis system, a dynamic monitoring management system and an achievement evaluation visualization system.

The mobile data collection system is configured for investigators to obtain server side information, connect to the communication relay apparatus and the tree diameter measuring sensor on survey site for restoration of sample trees on the inventory sample plot and collection, input and computing of data, configure and manage the communication relay apparatus and the tree diameter measuring sensor on site, receive device maintenance information by patrol personnel, survey changes of the inventory sample plot, and update devices.

Figure 2:
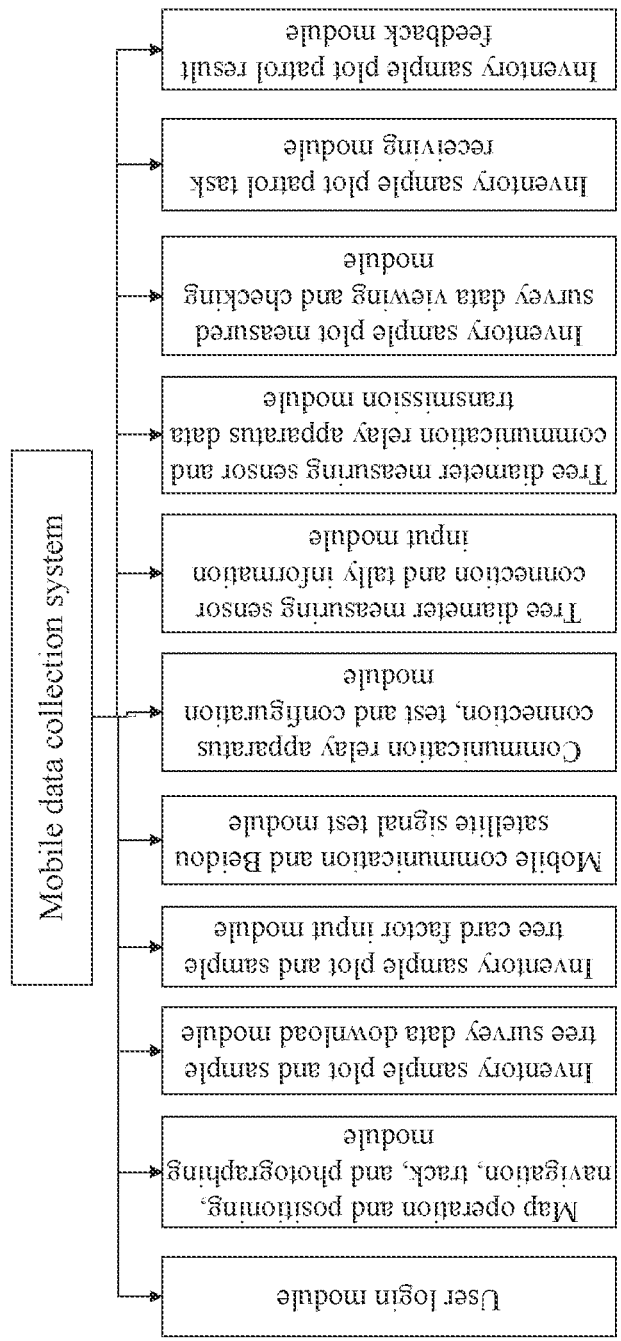
FIG. 2 is a structural block diagram of a mobile data collection system according to an embodiment of the present invention.

As shown in FIG. 2, the mobile data collection system includes a user login module, a map operation and positioning, navigation, track, and photographing module, an inventory sample plot and sample tree survey data download module, an inventory sample plot and sample tree card factor input module, a mobile communication and Beidou satellite signal test module, a communication relay apparatus connection, test and configuration module, a tree diameter measuring sensor connection and tally information input module, a tree diameter measuring sensor and communication relay apparatus data transmission module, an inventory sample plot measured survey data viewing and checking module, an inventory sample plot patrol task receiving module, and an inventory sample plot patrol result feedback module.

The user login module is configured to verify a user identity and log in to the mobile data collection system.

The map operation and positioning, navigation, track, and photographing module is configured to provide a user with interactive modes based on map operations, and provide basic map operation functions of translation, zoom-in, zoom-out, hierarchical display, and the like, and advanced map operation functions including positioning, navigation, track collection, photographing, and the like.

The inventory sample plot and sample tree survey data download module is configured for the user to download survey forms such as sample plot cards of previous national forest resources continuous inventory, an inventory sample plot database, field survey record forms, and the like, as well as basic data and tables such as satellite remote sensing images, inventory technical rules, dominant tree species maps, and unitary volume tables.

The inventory sample plot and sample tree card factor input module is configured for the user to input basic information of the inventory sample plot, sample plot positioning and arrangement, survey records of sample plot factors, measured maps of fixed sample trees, tree height measurement records, forest disaster survey records, vegetation survey records, underwood survey records, natural regeneration survey records, sample plot change survey records during a review period, unformed afforestation land survey records, bamboo scale record charts, miscellaneous bamboo sample survey record charts, economic tree species survey record charts, and track photo recorded information.

The mobile communication and Beidou satellite signal test module is configured for a user to measure types of mobile signals on site, and prompt the user to select a mobile communication relay apparatus if there are 2/3/4/5G mobile operator signals, or prompt the user to select a Beidou communication relay apparatus and if there are no mobile operator signals. After communication relay is selected, the mobile communication and Beidou satellite signal test module may test strengths of mobile signals or Beidou signals, and test a success rate of data transmission by communicating with a communication receiving end.

The communication relay apparatus connection, test and configuration module is configured for the user to connect to the communication relay apparatus by using the data collection terminal, set a data collection frequency, determine start time and start duration of the communication relay apparatus and the tree diameter measuring sensor, and estimate a theoretical monitoring time length according to the data collection frequency set by the user and battery capacity.

The tree diameter measuring sensor connection and data input module is configured for the user to connect to the tree diameter measuring sensor by using the data collection terminal, and after confirming the correct connection, input information of a surveyed sample tree, such as a sample tree number, a standing tree type, a tally type, a tree species name, a tree species code, an early diameter at breast height, a forest layer, a cross-angle land type serial number, an azimuth angle, and a horizontal distance.

The tree diameter measuring sensor and communication relay apparatus data transmission module is configured for the user to trigger background communication events of the tree diameter measuring sensor and the communication relay apparatus after the information of the surveyed sample tree is input, where the tree diameter measuring sensor transmits the device number and the survey input sample tree information through the wireless communication module to the communication relay apparatus for storage.

The inventory sample plot measured survey data viewing and checking module is configured for the user to, after survey of all sample trees is completed, connect to the communication relay apparatus by using the data collection terminal, obtain all tree diameter sensor data stored in the communication relay apparatus to the data collection terminal, compare the tree diameter sensor data with previous survey and surveillance data, check whether there are missing data, check abnormal change data, and check whether the tree diameter measuring sensor currently installed has low battery capacity.

The inventory sample plot patrol task receiving module is configured to, when receiving an inventory sample plot patrol task issued by a provincial or national user, view patrol task information including the number of a patrolled inventory sample plot and main patrol content, submit patrol task personnel and a time schedule after acknowledgment, and receive provincial or national task completion acknowledgment information after patrol.

The inventory sample plot patrol result feedback module is configured for the user to fill in patrol task completion after the inventory sample plot is patrolled on site, fill in update information factors for a device to be updated, or retest the inventory sample plot and arrange monitoring devices, and provide on-site patrol results and photos.

A data summarization, statistical analysis and management system is configured for natural resources forestry authorities to summarize and count inventory sample plot data that are surveyed and collected by the data collection terminal and automatically collected by monitoring devices, check a logical relationship between survey cards, analyze overall sampling accuracy, count achievement reports, and provide survey form templates that the mobile data collection system need to download and related data table configuration functions.

Figure 3:
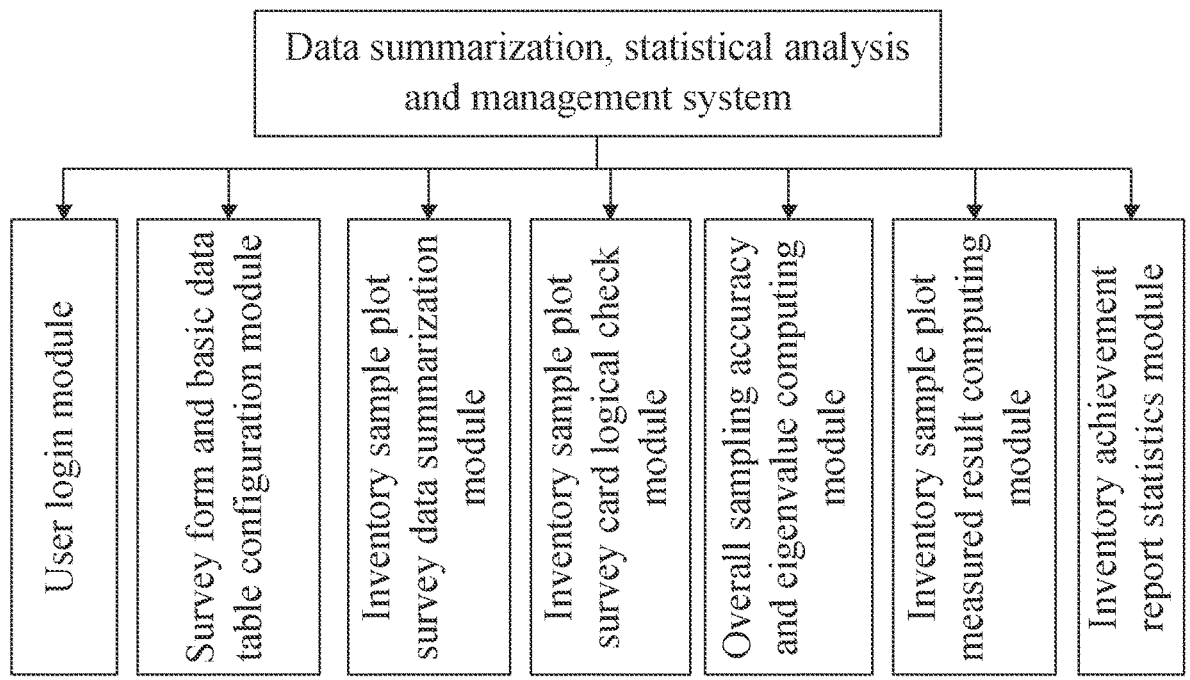
FIG. 3 is a structural block diagram of a data summarization, statistical analysis and management system according to an embodiment of the present invention.

As shown in FIG. 3, the data summarization, statistical analysis and management system includes a user login module, a survey form and basic data table configuration module, an inventory sample plot survey data summarization module, an inventory sample plot survey card logical check module, an overall sampling accuracy and eigenvalue computing module, an inventory sample plot measured result computing module, and an inventory achievement report statistics module.

The user login module is configured to verify a user identity and log in to the data summarization, statistical analysis and management system.

The survey form and basic data table configuration module is configured to configure survey forms such as sample plot cards of previous national forest resources continuous inventory, an inventory sample plot database, and field survey record forms, as well as basic data and tables such as satellite remote sensing images, inventory technical rules, dominant tree species maps, and unitary volume tables.

The inventory sample plot survey data summarization module is configured for the user to summarize tree diameter measuring sensor data returned by each communication relay apparatus through a receiving apparatus, and compute measured survey results of an inventory sample plot by using basic data tables such as a tree height curve model and an unitary volume table model. The measured survey results include a composition, ages, an average diameter, and an average height of each tree species, stock of living standing trees on a sample plot, stock of living standing trees per hectare, a quantity of living standing trees on the sample plot, a quantity of living standing trees per hectare, a quantity of dead standing trees per hectare, stock of dead standing trees per hectare, a quantity of fallen trees per hectare, stock of fallen trees per hectare, as well as compositions, stock of living standing trees per hectare, and a quantity of living standing trees per hectare of overall tree species on the sample plot.

The inventory sample plot survey card logical check module is configured for the user to check a logical relationship between survey factors in national forest resources continuous inventory sample plot cards, including required item check, non-filling item check, dictionary item check, and logical relationship check.

The overall sampling accuracy and eigenvalue computing module is configured for the user to count and generate overall sampling accuracy and eigenvalues of each monitored object, where the overall sampling accuracy and eigenvalues include, but not limited to, a quantity of sample units, an average quantity of samples, variation coefficients, sampling accuracy, an estimated median value, an estimated interval, a sample plot restoration rate, and a sample tree restoration rate. The monitored objects include, but are not limited to, total stock of standing trees, forest stock, artificial forest stock, natural forest stock, net increase of total stock, total growth, total consumption, area of a forest land, area of an arbor forest land, area of a bamboo forest, area of a forest, area of an artificial forest, area of a natural forest, net increase of forest area, and net increase of forest stock.

The inventory sample plot measured result computing module is configured to compute measured survey results of a standard plot according to an unitary volume table after the user obtains tally data of the inventory sample plot. The measured survey results include a composition, ages, an average diameter, and an average height of each tree species on an inventory sample plot, stock of living standing trees, stock of living standing trees per hectare, a quantity of living standing trees, a quantity of living standing trees per hectare, a quantity of dead standing trees per hectare, stock of dead standing trees per hectare, a quantity of fallen trees per hectare, and stock of fallen trees per hectare on a standard plot, as well as compositions, stock of living standing trees per hectare, and a quantity of living standing trees per hectare of overall tree species on the inventory sample plot.

The inventory achievement report statistics module is configured for the user to generate statistical tables of the national forest resources continuous inventory achievements, including but not limited to various types of land ownership statistics tables, various types of forest stock ownership statistics tables, dynamic tables of various types of land area, dynamic tables of various types of forest stock, statistical tables of annual growth and consumption of various types of forest stock, computing tables of overall characteristic numbers, and the like.

When building of the perception layer and the network layer is completed, a dynamic monitoring management system supervises statuses of communication relay apparatuses and tree diameter measuring sensors arranged in all inventory sample plots, establish a management system for investigators and forest rangers, delimit device maintenance responsibilities in grids, issue patrol tasks for inventory sample plots and confirm device maintenance and update results when lost device statuses are found.

Figure 4:
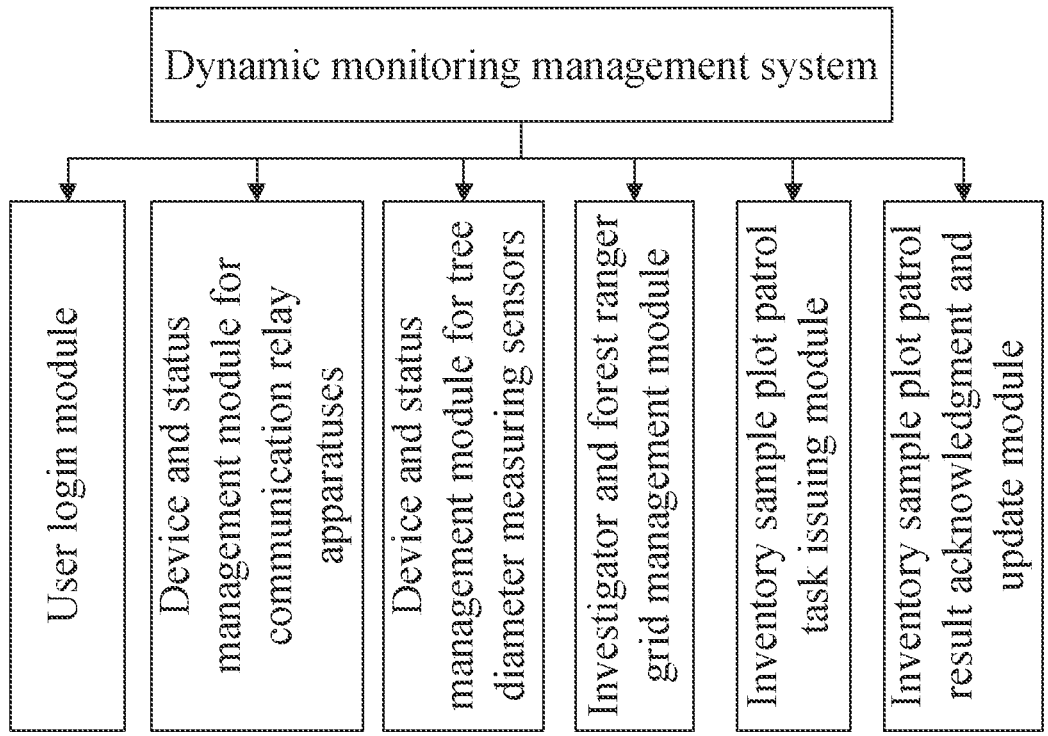
FIG. 4 is a structural block diagram of a dynamic monitoring management system according to an embodiment of the present invention.

As shown in FIG. 4, the dynamic monitoring management system includes a user login module, a device and status management module for communication relay apparatuses, a device and status management module for tree diameter measuring sensors, an investigator and forest ranger management module, an inventory sample plot patrol task issuing module, and an inventory sample plot patrol result acknowledgment and update module.

The user login module is configured to verify a user identity and log in to the dynamic monitoring management system.

The device and status management module for communication relay apparatuses is configured for a user to inquire a device number, a device type and a coordinate position of a communication relay apparatus and number information of a sample plot, check an operating status, battery capacity and sensor measured data of the communication relay apparatus, and configure a monitoring frequency, wake-up time and wake-up duration for the communication relay apparatus.

The device and status management module for tree diameter measuring sensors is configured for the user to inquire a device number of a tree diameter measuring sensor and number information of a sample plot, check an operating status, battery capacity and sensor measured data of the tree diameter measuring sensor, and configure wake-up time and wake-up duration for the tree diameter measuring sensor.

The investigator and forest ranger management module is configured to establish and manage accounts and permissions of investigators and forest rangers, delimit and divide management and protection grids for the investigators and the forest rangers, and establish a cooperative relationship between the investigators and the forest rangers.

The inventory sample plot patrol task distribution module is configured for the user to determine a device fault inventory sample plot in a case of device status loss discovered by the device and status management module for communication relay apparatuses and the device and status management module for tree diameter measuring sensors, find investigators and forest rangers who maintain the device fault inventory sample plot, initiate a device maintenance task, send the number and loss information of the status lost device to data collection terminals of the investigators and the forest rangers, and view a task progress in real time.

The inventory sample plot patrol result acknowledgment and update module is configured for the user to receive and summarize task reception and completion of the investigators and the forest rangers, and terminate the device maintenance task after completing the maintenance.

An achievement evaluation visualization system is configured to carry out forest resources evaluation, ecosystem evaluation and key region evaluation based on the model knowledge base, and provide visual data display and sharing services based on basic data and evaluation results for other basic research or social applications.

Figure 5:
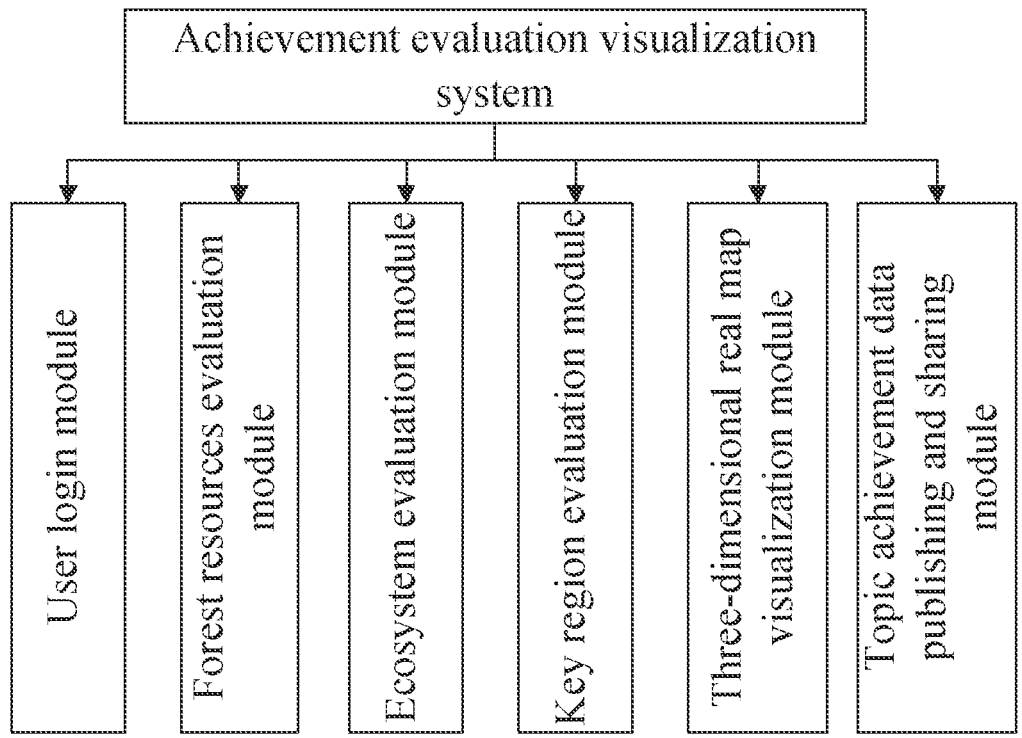
FIG. 5 is a structural block diagram of an achievement evaluation visualization system according to an embodiment of the present invention.

As shown in FIG. 5, the achievement evaluation visualization system includes a user login module, a forest resources evaluation module, an ecosystem evaluation module, a key region evaluation module, a three-dimensional real map visualization module, and a topic achievement data publishing and sharing module.

The user login module is configured to verify a user identity and log in to the achievement evaluation visualization system.

The forest resources evaluation module is configured for a user to generate a forest area and a forest stock, a forest structure such as high forest species, tree species and an age group structure and dynamic changes thereof according to the inventory sample plot survey and summarization results, and evaluate the forest area and quality changes.

The ecosystem evaluation module is configured for the user to generate a series of evaluation indexes and indicators such as ecosystem pattern, ecosystem quality, biodiversity status, ecosystem carbon sink capacity, ecosystem functions, ecosystem service value, and land degradation status based on the model knowledge base.

The key region evaluation module is configured for the user to comprehensively evaluate a status, quality, carbon sink, and functional benefits of an ecosystem in a national key strategy and social key concern region.

The three-dimensional real map visualization module is configured for the user to display national or provincial national forest resources continuous inventory achievement data in a big data visualization manner by using a three-dimensional real map and other interaction modes, and carry out comparative analysis and prediction analysis on the data for a long time series.

The topic achievement data sharing module is configured for the user to display data resources, services and applications owned and produced by the national forest resources continuous inventory cloud platform according to different types and different permissions, and the user may access a resource center in a browser or a mobile terminal, to obtain and make topic resources and implement sharing and exchange.

The user layer includes, but is not limited to, four types of direct users: professional investigators and forest rangers, provincial people's governments and the State Council, natural resources and forestry authorities, scientific researchers and popular science educators.

The professional investigators and forest rangers complete survey restoration and device status maintenance of inventory sample plots in a monitoring period, and are main data collectors and maintainers, who mainly use the mobile data collection system to summarize collected data into the data summarization and statistical analysis system and receive device maintenance tasks from the dynamic monitoring management system.

The provincial people's governments and the State Council obtain current situations and changing trends of national and provincial forest resources and forest ecosystems in a dynamic monitoring period through the achievement evaluation visualization system, provide decision support for ecological civilization construction, and obtain data sharing interfaces to share data value for higher-level system applications.

The natural resources and forestry authorities are responsible for organizing and completing the construction of the national forest resources continuous inventory cloud platform, building teams of investigators and forest rangers, maintaining the operation of the data summarization and statistical analysis system and the dynamic monitoring management system, producing national forest resources continuous inventory achievements, and providing data support for long-term forest governance, forest resources protection and development assessment, and the like.

The researchers and popular science educators maintain the model knowledge database through professional knowledge, enrich application scenarios and scopes of data achievements by using the achievement evaluation visualization system, and publicize and display the value and significance of forest resources protection.

The national forest resources continuous inventory cloud platform operates from bottom to top according to each layer of the cloud platform:

(1) By arranging tree diameter measuring sensors, an environmental sensor, and tilt sensors, the perception layer collects and obtains radial growth of sample trees, checks temperature and humidity environmental factors of an inventory sample plot and type information of sample trees, stores and transmits collected information to devices on the network layer through the data collection terminal, and configures and manages devices on the perception layer and the network layer.

(2) The network layer comprehensively uses a wireless ad hoc network, a mobile communication network, a satellite communication network, an optical fiber communication network and the Internet, where a mobile/Beidou communication relay apparatus is laid on the inventory sample plot, the wireless ad hoc network is used to gather data collected by the perception layer, the mobile communication network or the satellite communication network transmits the data to a platform layer connected by the optical fiber network, and the platform layer provides data exchange and sharing services to users through the Internet after processing the data.

(3) The platform layer provides computing, storage and network resources for the national forest resources continuous inventory cloud platform, where unified management is implemented through a virtualization management platform, and an application platform is deployed on the cloud platform to provide, for software and systems of the data layer and the application layer, platform capability services including but not limited to an operating system, a database platform, a GIS platform, and network middleware.

(4) The data layer uses the resources of the platform layer and the capabilities of the application platform to build databases including but not limited to a sample plot and sample tree survey database, a data achievement and quality inspection database, a monitoring operation database and a model knowledge base, mainly uses an enterprise-level geospatial database to store and manage data such as spatial vector data, raster data, audio and video multimedia data, and text files collected by the perception layer, and publishes the data as map services through the GIS platform to implement data sharing.

(5) The application layer builds the mobile data collection system and is deployed in the data collection terminal for data collection and device management in the perception layer, designs the data summarization and statistical analysis system to gather the collected data into various databases in the data layer, and builds the dynamic monitoring management system and the achievement evaluation visualization system, to provide a user with dynamic monitoring of inventory sample plots and devices, maintenance and update of facilities and devices, and evaluation, sharing and visualization services for monitoring achievements.

(6) The investigators and foresters in the user layer are responsible for first restoration survey and device arrangement for an inventory sample plot, as well as patrol tasks and device maintenance for the inventory sample plot during a monitoring period. The provincial people's governments and the State Council obtain current situations and changing trends of national and provincial forest resources and forest ecosystems in a dynamic monitoring period, and provide decision support for ecological civilization construction. The natural resources and forestry authorities maintain the operation of the national forest resources continuous inventory monitoring platform, and carry out long-term forest governance, forest resources protection and development assessment, and the like on this basis. The researchers use the data produced by the platform to complete monitoring, evaluation, and scientific research of "green reservoirs, green carbon banks, green oxygen bars, and biological gene banks" in forest ecological benefits. The popular science educators popularize the protection value of "green waters and green hills" to the public.

Operation modes of the perception layer and the network layer According to whether a national forest resources continuous inventory sample plot is covered by a 4G or 5G network of a mobile communication operator, the devices on the perception layer and the network layer operate in a Beidou short message transmission mode and a mobile communication transmission mode.

The Beidou short message transmission mode is as follows:

(1) Measured values of the tree diameter measuring sensor, the environmental sensor and the tilt sensor are connected to the Beidou communication relay apparatus by using a wireless transmission protocol such as WiFi, Bluetooth, or Lora, and undergo clock synchronization with the Beidou communication relay apparatus, and the measured information is transmitted to the Beidou communication relay apparatus for storage.

(2) The data collection terminal is connected to the tree diameter measuring sensor by using the wireless transmission protocol such as WiFi, Bluetooth, or Lora to obtain measured values, and records other sample plot information, such as a sample plot visual inspection factor, sample tree species, and a tally type.

(3) The data collection terminal is connected to the Beidou communication relay apparatus by using the wireless transmission protocol such as WiFi, Bluetooth, or Lora, and the data collected by the data terminal are stored into the Beidou communication relay apparatus.

(4) The Beidou communication relay apparatus transmits the stored data to a Beidou directing device through the Beidou satellite by using Beidou short message technology.

(5) The Beidou directing device transmits the obtained information to the network server in the platform layer through an optical fiber network connection, and the information is used by the data layer and the application layer.

The mobile communication transmission mode is as follows:

(1) Measured values of the tree diameter measuring sensor, the environmental sensor and the tilt sensor are connected to the mobile communication relay apparatus by using a wireless transmission protocol such as WiFi, Bluetooth, or Lora, and undergo clock synchronization with the mobile communication relay apparatus, and the measured information is transmitted to the mobile communication relay apparatus for storage.

(2) The data collection terminal is connected to the tree diameter measuring sensor by using the wireless transmission protocol such as WiFi, Bluetooth, or Lora to obtain measured values, and records other sample plot information, such as a sample plot visual inspection factor, sample tree species, and a tally type.

(3) The data collection terminal is connected to the mobile communication relay apparatus by using the wireless transmission protocol such as WiFi, Bluetooth, or Lora, and the data collected by the data terminal are stored into the mobile communication relay apparatus.

(4) The mobile communication relay apparatus transmits the stored data to the communication server through the mobile communication base station by using a communication protocol including, but not limited to, NB-IOT, GPRS, 3G, 4G, and 5G.

(5) The communication server transmits the obtained information to the network server in the platform layer through an optical fiber network connection, and the information is used by the data layer and the application layer.

Operation mode of the platform layer
(1) The platform layer builds an X86 computing server for a computing resource pool, a storage server for a storage resource pool, and devices such as a network server and a gateway for a network resource pool, and performs virtualization management on computing, storage, and network resources through virtualization platform software.
(2) Virtual machines are planned and distributed on the virtualization platform, and application platforms such as an operating system, a database platform, a GIS platform, and network middleware are deployed on the virtual machines.
(3) The network server receives, through an optical fiber network, the transmitted data information obtained from the Beidou directing device and the communication server, and stores the data information into various topic databases in the data layer according to data types.

Operation mode of the data layer
(1) Virtual machines for data storage and processing are distributed by using the virtualization platform, and an enterprise-level geospatial database is created by using the GIS platform and the database platform.
(2) A sample plot and sample tree survey database is created in the enterprise-level geospatial database, to store data of previous national forest resources continuous inventory questionnaires, and real-time monitored data collected and transmitted by the perception layer and the network layer in a time series.
(3) A data achievement and quality inspection database is created in the enterprise-level geospatial database, to store national and provincial summary, statistics, computing achievement data of previous national forest resources continuous inventory and quality inspection questionnaire data, and at the same time, the data in real-time monitoring sample plot and sample tree survey database are counted and computed.
(4) A monitoring operation database is created in the enterprise-level geospatial database, to store operation statuses of the tree diameter measuring sensor and the communication relay apparatus, device fault processing data, and management information such as personnel information, roles, and permissions of investigators, forest rangers, and management users.
(5) A model knowledge base is created in the enterprise-level geospatial database, to store unitary volume tables, models of ecological function value evaluation and comprehensive evaluation of an ecological system, and basic data tables, which are needed for survey and computing.

Operation mode of the application layer and the user layer
(1) The professional investigators use the mobile data collection system to arrive at an inventory sample plot, complete arrangement of devices on the perception layer and the network layer for the sample plot, return collected data through the Beidou/mobile communication relay apparatus, store the data into the sample plot and sample tree survey database, and finally manage the data through the data summarization, statistical analysis and management system.
(2) Personnel in the natural resources/forestry authorities summarize, count and analyze, through the data summarization and statistical analysis system, the survey data obtained by the data collection terminal, to generate important index information such as quantities, qualities, structures and distribution of forests, trees and forest lands, and areas and stocks of forest origins, ownerships, age groups, forest species and tree species, forest growth and consumption, and dynamic changes thereof, store the information into the data achievement and quality inspection database, and report and display achievements in the database to the provincial people's governments/State Council.
(3) Personnel in the natural resources/forestry authorities perceive and discover changes of an inventory sample plot through the dynamic monitoring and management system, establish a grid management mode for professional investigators and forest rangers, delimit maintenance responsibilities for the devices on the perception layer and the network layer, issue inventory sample plot patrol tasks, confirm device maintenance and update results, and store the operation results in the monitoring operation database.
(4) The natural resources/forestry authorities/researchers build a model knowledge base through the achievement evaluation visualization system, carry out forest resources evaluation, ecosystem evaluation and key region evaluation, and provide visual data display and sharing services based on basic data and evaluation results for other basic research or social applications. The popular science educators use the achievements and shared services to publicize and display the value and significance of forest resources protection.

Figure 6:
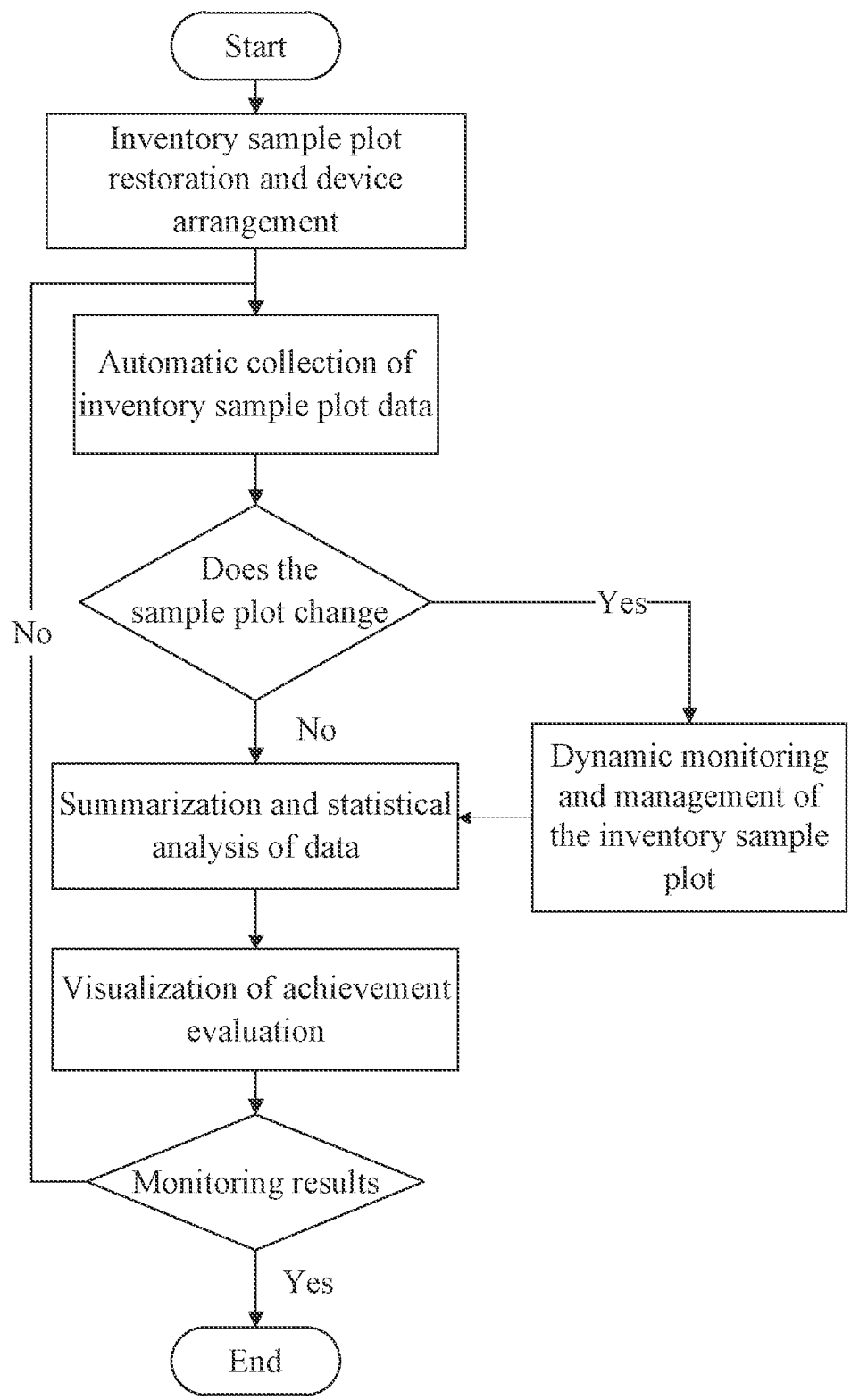
FIG. 6 is a schematic flowchart of a national forest resources continuous inventory sample plot monitoring method according to an embodiment of the present invention.

The present invention further provides a national forest resources continuous inventory sample plot monitoring method, as shown in FIG. 6, which is implemented as follows: The method includes the following steps:
(1) Inventory sample plot restoration and device arrangement: complete sample plot restoration and sample tree retest for an inventory sample plot, and arrange devices on the perception layer and the network layer;
(2) Automatic collection of inventory sample plot data: the devices on the perception layer in the inventory sample plot return data at a set monitoring frequency, and the platform layer parses and stores the collected data the collected data;
(3) Determine, according to the automatically collected data information, whether the perception layer and the inventory sample plot change, and if so, entering step (4), otherwise entering step (5);
(4) Dynamic monitoring and management of the inventory sample plot: issue a sample plot patrol task, confirm device maintenance and update results, keep continuous monitoring on the inventory sample plots, and enter step (5);
(5) Summarization and statistical analysis of data: summarize survey data of sample trees in inventory sample plots, check data logic and overall sampling accuracy, count important index information of each inventory sample plot and monitored objects during a monitoring period, and generate achievement statistics reports;
(6) Visualization of achievement evaluation: build a model knowledge base, carry out forest resources monitoring, ecosystem evaluation and key region evaluation, and provide visual data display and sharing services; and
(7) Determine whether the monitoring is finished, and if so, terminate the process, otherwise execute step (2) to carry out continuous monitoring.

Figure 7:
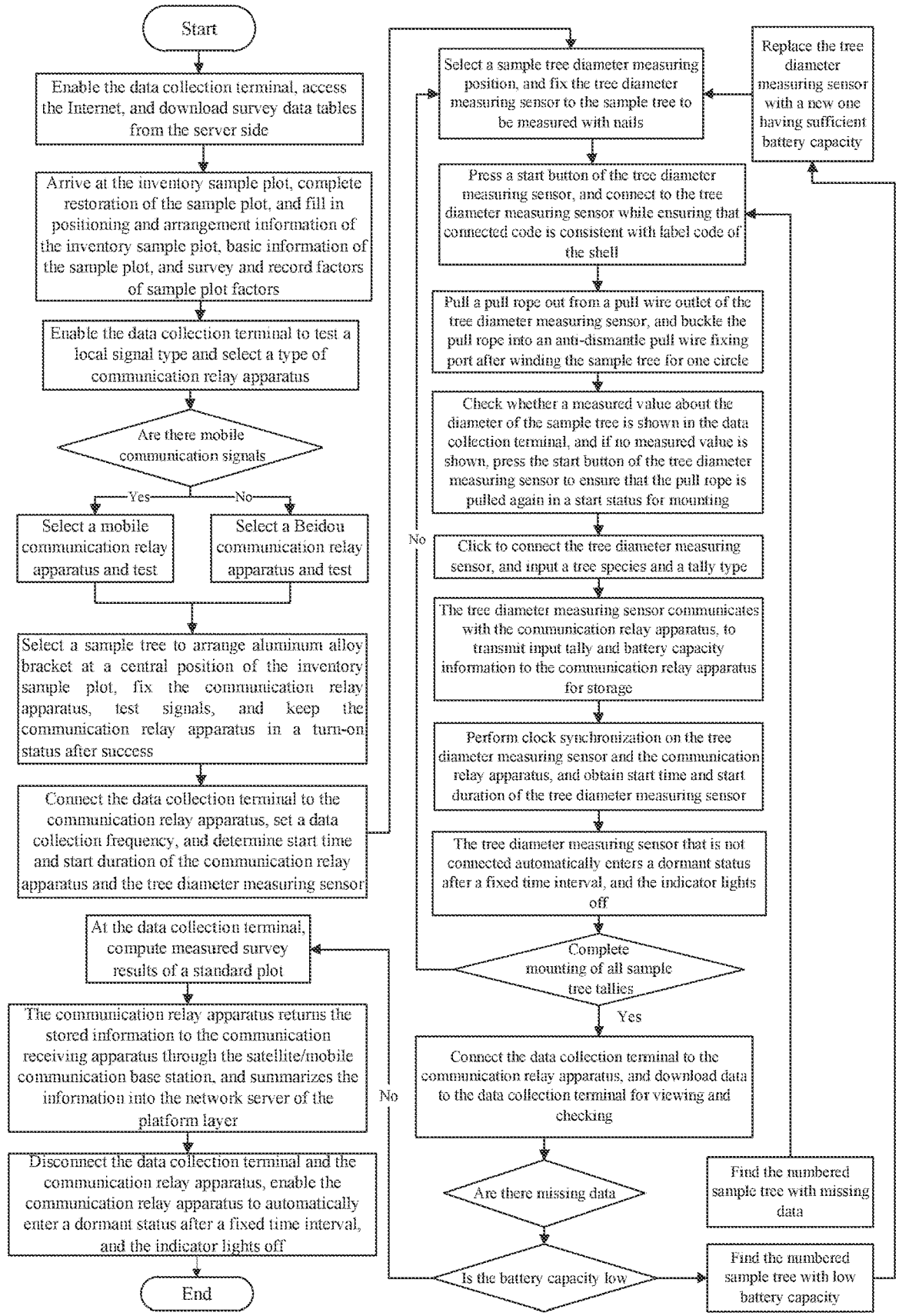
FIG. 7 is a schematic flowchart of inventory sample plot restoration and device arrangement according to an embodiment of the present invention.

Specifically, as shown in FIG. 7, specific operation steps in step (1) are as follows:
(1.1) Enable the data collection terminal, access the Internet, and download data tables including inventory sample survey spreadsheets and an unitary volume table model from the server side;

(1.2) Arrive at the inventory sample plot, complete restoration of the sample plot, and fill in positioning and arrangement information of the inventory sample plot, basic information of the sample plot, and survey and record factors of sample plot factors;

(1.3) Enable the data collection terminal to test a local signal type and select a type of communication relay apparatus, where a mobile communication relay apparatus is selected in the presence of 4G or 5G mobile operator signals, and a Beidou communication relay apparatus is selected in the absence of mobile operator signals;

(1.4) Select a sample tree to arrange aluminum alloy bracket at a central position of the inventory sample plot, fix the communication relay apparatus, test signals, and keep the communication relay apparatus in a turn-on status after success;

(1.5) Connect the data collection terminal to the communication relay apparatus, set a data collection frequency, and determine start time and start duration of the communication relay apparatus and the tree diameter measuring sensor;

(1.6) Select a sample tree diameter measuring position, and fix the tree diameter measuring sensor to a measured sample tree with nails;

(1.7) Press a start button of the tree diameter measuring sensor, an indicator lights up, and connect the data collection terminal to the tree diameter measuring sensor while ensuring that code for displaying the connected tree diameter measuring sensor is consistent with label code of the shell of the tree diameter measuring sensor;

(1.8) Pull a pull rope out from a pull wire outlet of the tree diameter measuring sensor, and buckle the pull rope into an anti-dismantle pull wire fixing port after winding the sample tree for one circle;

(1.9) Check whether a measured value about the diameter of the sample tree is shown in the data collection terminal, and if no measured value is shown, press the start button of the tree diameter measuring sensor to ensure that the pull rope is pulled again in a start status for mounting;

(1.10) Click to connect the tree diameter measuring sensor, and input a tree species and a tally type, where the tree species and the tally type are filled with code according to coding requirements of technical regulations, for example, the tree species is cypress, and the code is filled with 601; and the tally type is a preserved tree, and the code is filled with 11;

(1.11) The tree diameter measuring sensor communicates with the communication relay apparatus, to transmit input tally and battery capacity information to the communication relay apparatus for storage;

(1.12) Perform clock synchronization on the tree diameter measuring sensor and the communication relay apparatus, and obtain start time and start duration of the tree diameter measuring sensor;

(1.13) The tree diameter measuring sensor that is not in communication connection automatically enters a dormant status after a fixed interval;

(1.14) Repeat steps (1.6-1.13) to complete mounting of tallies and tree diameter measuring sensors for all sample trees in the inventory sample plot;

(1.15) Connect the data collection terminal to the communication relay apparatus, download data to the data collection terminal for viewing and checking, check whether there are missing data, for example, a diameter at breast height, tree species and a tally type are null, and if there are missing data, find the numbered sample tree with missing data or low battery capacity, and execute steps (1.7-1.13);

(1.16) Check whether there is low battery capacity, and if so, find the numbered sample tree with low battery capacity, replace the tree diameter measuring sensor with a new one having sufficient battery capacity, and execute steps (1.6-1.13);

(1.17) At the data collection terminal, compute measured survey results of a standard plot, including a composition, ages, an average diameter, and an average height of each tree species, a stock of living standing trees on the sample plot, a stock of living standing trees per hectare, a quantity of living standing trees on the standard plot, a quantity of living standing trees per hectare, a quantity of dead standing trees per hectare, a stock of dead standing trees per hectare, a quantity of fallen trees per hectare, a stock of fallen trees per hectare, as well as compositions, a stock of living standing trees per hectare, and a quantity of living standing trees per hectare of overall tree species on the sample plot;

(1.18) The communication relay apparatus returns the stored information to the communication receiving apparatus through the base station, and summarizes the information into the network server of the platform layer, where the information returned through a satellite is returned to the Beidou directing device for summarization into the network server, and the information returned through the mobile communication base station is returned to the communication server for summarization into the network server; and (1.19) Disconnect the data collection terminal and the communication relay apparatus, and enable the communication relay apparatus to automatically enter a dormant status after a fixed interval.

Figure 8:
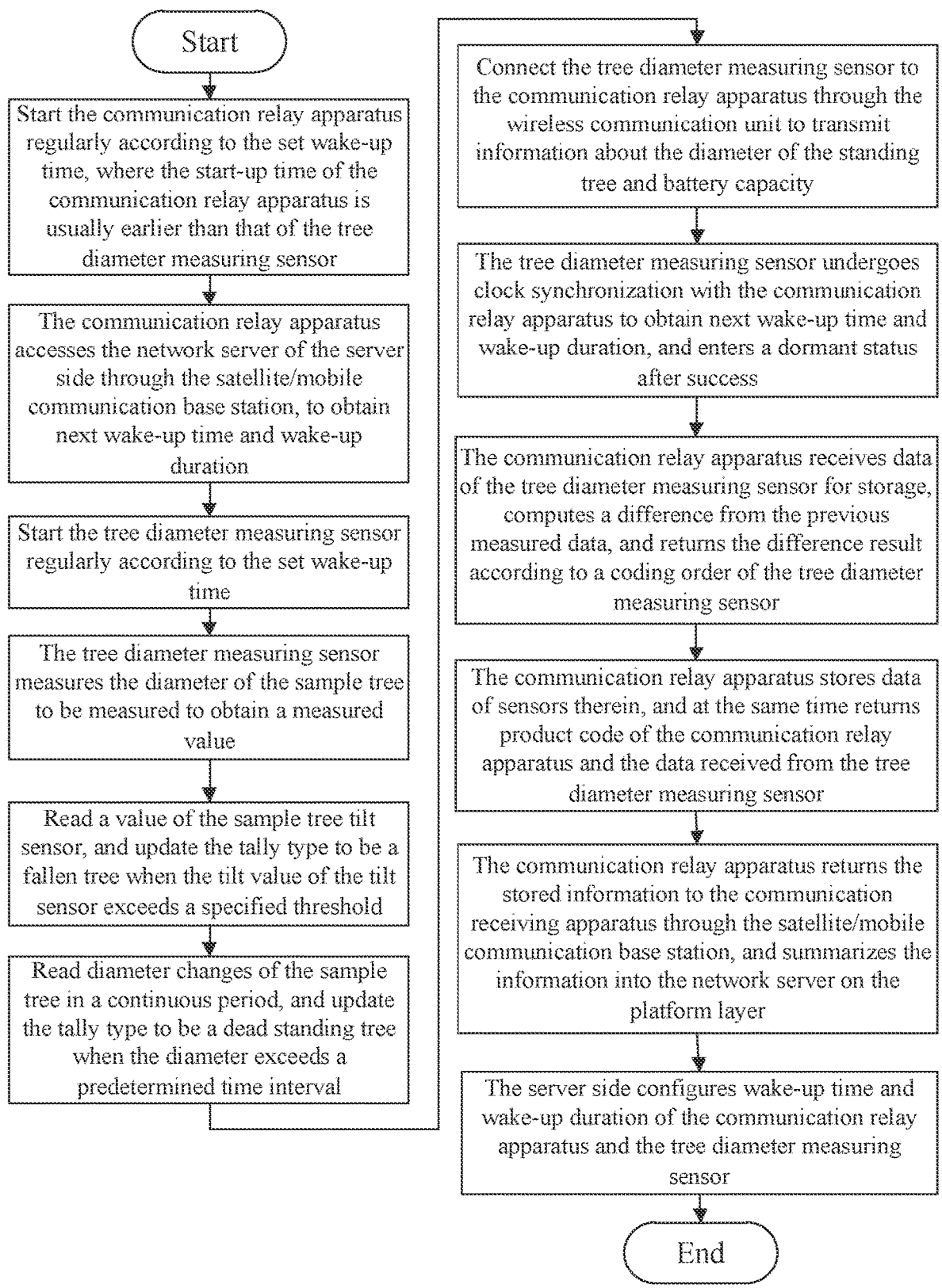
FIG. 8 is a schematic flowchart of automatic collection of inventory sample plot data according to an embodiment of the present invention.

As shown in FIG. 8, specific operation steps in step (2) are as follows:

(2.1) Start the communication relay apparatus regularly according to the set wake-up time, where the start-up time of the communication relay apparatus is usually earlier than that of the tree diameter measuring sensor;

(2.2) The communication relay apparatus accesses the network server of the server side through the satellite/mobile communication base station, to obtain next wake-up time and wake-up duration;

(2.3) Start the tree diameter measuring sensor regularly according to the set wake-up time;

(2.4) The tree diameter measuring sensor measures the diameter of a measured sample tree to obtain a measured value;

(2.5) Read a value of the sample tree tilt sensor, determine that the current sample tree is a fallen tree when the tilt value of the tilt sensor exceeds a specified threshold, for example, the tilt angle exceeds 45°, and update the tally type to be a fallen tree;

(2.6) Read diameter changes of the sample tree in a continuous period, and update the tally type to be a dead standing tree when the diameter of the sample tree is constant or regularly reduced beyond a predetermined interval, for example 1 year;

(2.7) Connect the tree diameter measuring sensor to the communication relay apparatus through the wireless communication unit to transmit information about the diameter of the standing tree and battery capacity;

(2.8) The tree diameter measuring sensor undergoes clock synchronization with the communication relay apparatus to obtain next wake-up time and wake-up duration, and enters a dormant status after success;

(2.9) The communication relay apparatus receives data of the tree diameter measuring sensor for storage, computes a difference from the previous measured data, and returns the difference result according to a coding order of the tree diameter measuring sensor, where for a case that the tree diameter measuring sensor has not obtained a measured value currently, the difference is set to be 9999;

(2.10) The communication relay apparatus stores data of sensors therein, and at the same time returns product code of the communication relay apparatus and the data received from the tree diameter measuring sensor, where the sensors of the communication relay apparatus include, but are not limited to, temperature sensors, humidity sensors and tilt sensors, so as to monitor environmental factors of the inventory sample plot;

(2.11) The communication relay apparatus returns the stored information to the communication receiving apparatus through the satellite/mobile communication base station, and summarizes the information into the network server on the platform layer, where the information returned through the satellite is returned to the Beidou directing device for summarization into the network server, and the information returned through the mobile communication base station is returned to the communication server for summarization into the network server; and (2.12) The platform layer configures wake-up time and wake-up duration of the communication relay apparatus and the tree diameter measuring sensor.

Figure 9:
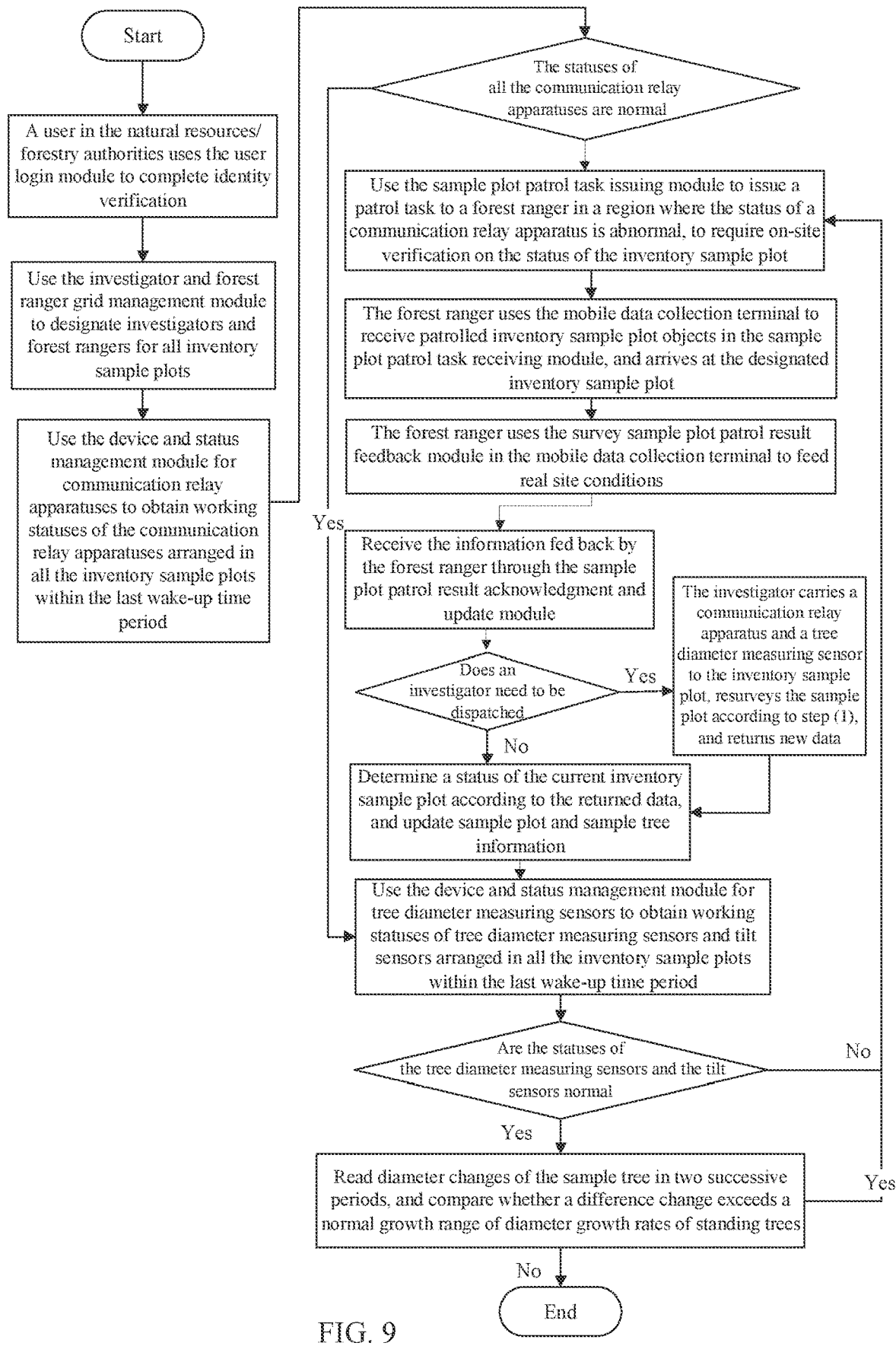
FIG. 9 is a schematic flowchart of dynamic monitoring and management of inventory sample plots according to an embodiment of the present invention.

As shown in FIG. 9, specific operation steps in step (4) are as follows:

(4.1) A user in the natural resources/forestry authorities uses the user login module to complete identity verification;

(4.2) Use the investigator and forest ranger grid management module to designate investigators and forest rangers for all inventory sample plots according to administrative area grids or kilometer grids, where one forest ranger patrols all inventory sample plots in one grid, and one investigator may provide technical support and device maintenance for a plurality of forest rangers;

(4.3) Use the device and status management module for communication relay apparatuses to obtain working statuses of the communication relay apparatuses arranged in all the inventory sample plots within the last wake-up time period;

(4.4) Check whether the statuses of all the communication relay apparatuses are normal, and if so, execute step (4.11), otherwise execute step (4.5);

(4.5) Use the sample plot patrol task issuing module to issue a patrol task to a forest ranger in a region where the status of a communication relay apparatus is abnormal, to require on-site verification on the status of the inventory sample plot;

(4.6) The forest ranger uses the sample plot patrol task receiving module in the data collection terminal to receive patrolled inventory sample plot objects, and arrives at the designated inventory sample plot;

(4.7) The forest ranger uses the survey sample plot patrol result feedback module in the data collection terminal to feed site conditions of the designated inventory sample plot back;

(4.8) Receive the feedback information in step (4.7) through the sample plot patrol result acknowledgment and update module, determine, according to the actual situation, whether an investigator needs to be dispatched to update devices or resurvey, and if so, execute step (4.9), otherwise execute step (4.10);

(4.9) The investigator carries a communication relay apparatus and a tree diameter measuring sensor to the inventory sample plot, resurveys the sample plot according to step (1), and returns new data;

(4.10) Determine a status of the current inventory sample plot according to the returned data, and update sample plot and sample tree information;

(4.11) Use the device and status management module for tree diameter measuring sensors to obtain working statuses of tree diameter measuring sensors and tilt sensors arranged in all the inventory sample plots within the last wake-up time period;

(4.12) Determine whether the statuses of all the tree diameter measuring sensors and tilt sensors are normal, and if so, execute step (4.13), otherwise execute step (4.5); and (4.13) Read diameter changes of the sample tree in two successive periods, and compare whether a difference change exceeds a normal growth range of diameter growth rates of standing trees, for example, the radial growth of a standing tree increases or decreases by more than 3 cm within one month; and if the difference change exceeds the normal growth range, determine that the current data are abnormal, and execute step (4.5), otherwise terminate the process.

Figure 10:
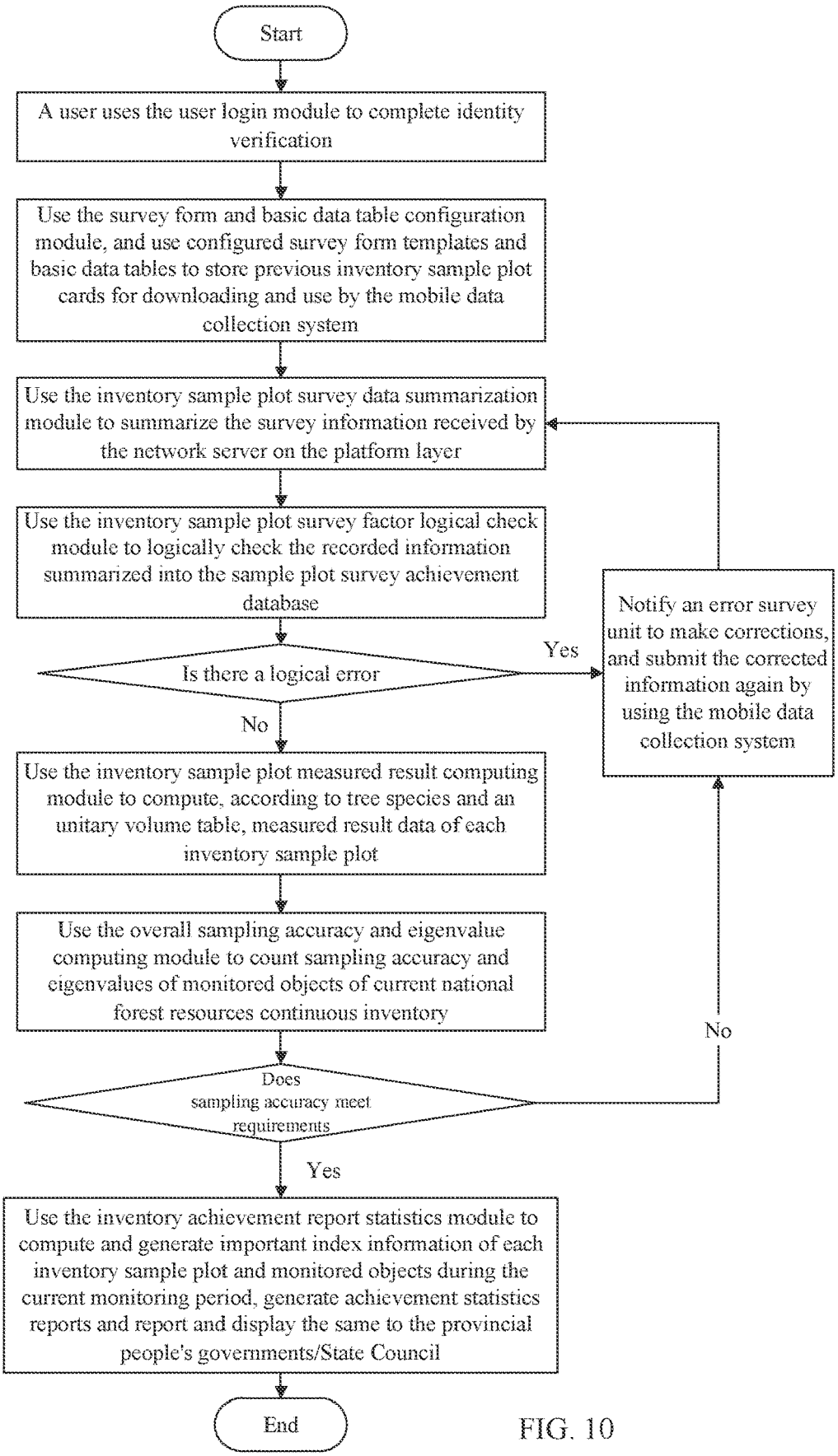
FIG. 10 is a schematic flowchart of data summarization and statistical analysis according to an embodiment of the present invention.

As shown in FIG. 10, specific operation steps in step (5) are as follows:

(5.1) A user uses the user login module to complete identity verification;

(5.2) Use the survey form and basic data table configuration module, and use configured survey form templates and basic data tables to store previous inventory sample plot cards for downloading and use by the mobile data collection system;

(5.3) Use the inventory sample plot survey data summarization module to summarize the survey information received by the network server on the platform layer;

(5.4) Use the inventory sample plot survey factor logical check module to logically check the recorded information summarized into the sample plot survey achievement database, determine whether there is a logical error, and if so, notify an error survey unit to make corrections, and submit the corrected information again by using the mobile data collection system until there is no logic error;

(5.5) Use the inventory sample plot measured result computing module to compute, according to tree species and an unitary volume table, measured result data of each inventory sample plot, including but not limited to, sample plot composition, age, average height, average diameter, stock per hectare, quantity of trees per hectare, sample plot stock, quantity of trees in the sample plot;

(5.6) Use the overall sampling accuracy and eigenvalue computing module to count sampling accuracy and eigenvalues of monitored objects of current national forest resources continuous inventory, interpret whether the sampling accuracy meets the requirements of the National Forest Resources Continuous Inventory Technical Regulations and the inventory rules, and if the sampling accuracy does not meet the requirements, notify the survey unit to make corrections, and submit the corrected sampling accuracy again by using the mobile data collection system until the accuracy requirements are met; and (5.7) Use the inventory achievement report statistics module to compute and generate important index information of each inventory sample plot and monitored objects during the current monitoring period, including but not limited to quantities, qualities, structures and distribution of forests, trees and forest lands, areas and stocks of forest origins, ownerships, age groups, forest species and tree species, forest growth and consumption, and dynamic changes thereof, generate achievement statistics reports and report and display the same to the provincial people's governments/State Council.

Figure 11:
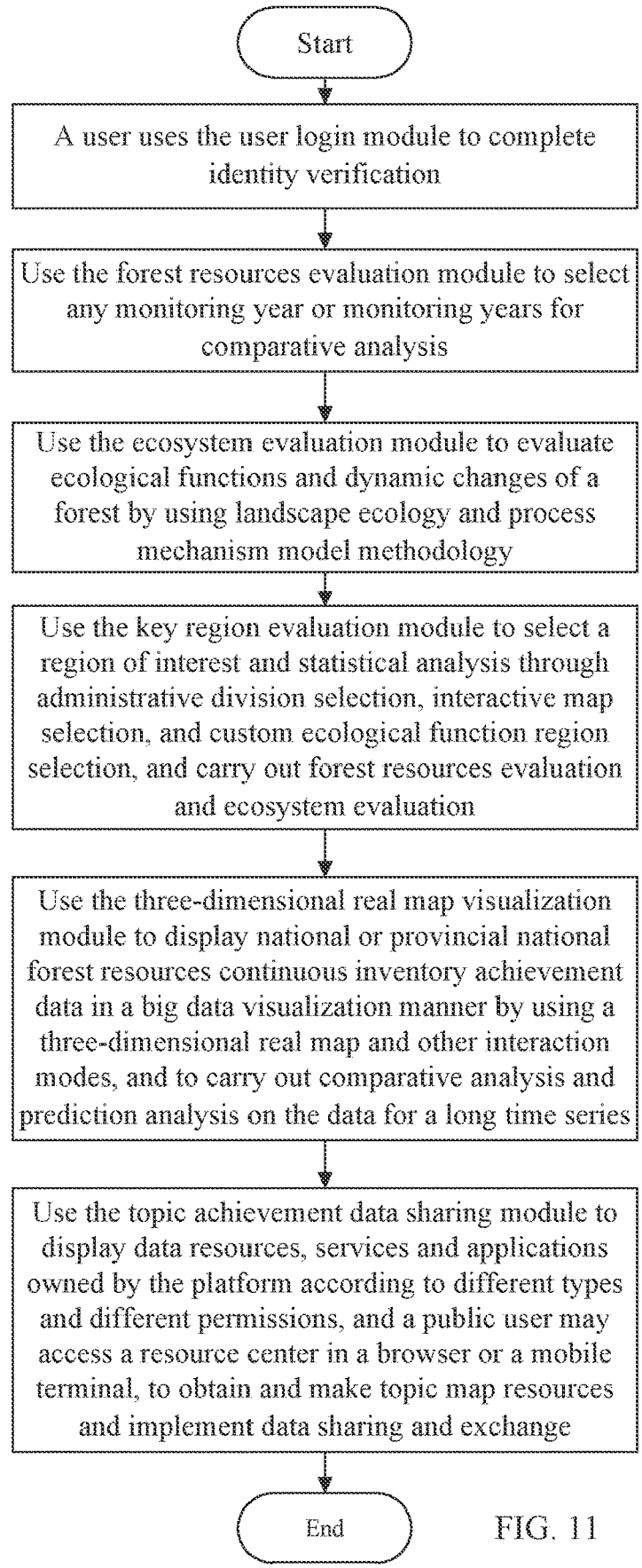
FIG. 11 is a schematic flowchart of an achievement evaluation visualization system according to an embodiment of the present invention.

The achievement evaluation visualization system flow in step (6) is that the scientific researchers/popular science workers build a model knowledge base through the achievement evaluation visualization system, carry out forest resources evaluation, ecosystem evaluation and key region evaluation, and provide visual data display and sharing services based on basic data and evaluation results for other basic research or social applications. As shown in FIG. 11, specific steps are as follows:

(6.1) A user uses the user login module to complete identity verification;

(6.2) The user uses the forest resources evaluation module to select any monitoring year or monitoring years for comparative analysis, including but not limited to key forest quantity, quality and spatial distribution changes and trends of forest area, forest stock, forest quality, and arbor forest quality;

(6.3) The user uses the ecosystem evaluation module to evaluate ecological functions and dynamic changes of a forest by using landscape ecology and process mechanism model methodology, including but not limited to key ecosystem status indexes and contents such as ecosystem type, ecosystem pattern, ecosystem quality, biodiversity status, forest ecosystem carbon sink capacity, and ecological service value of a forest ecosystem;

(6.4) The user uses the key region evaluation module to select a region of interest and statistical analysis through administrative division selection, interactive map selection, and custom ecological function region selection, and to carry out forest resources evaluation and ecosystem evaluation;

(6.5) The user uses the three-dimensional real map visualization module to display national or provincial national forest resources continuous inventory achievement data in a big data visualization manner by using a three-dimensional real map and other interaction modes, and to carry out comparative analysis and prediction analysis on the data for a long time series; and (6.6) The user uses the topic achievement data sharing module to display data resources, services and applications owned by the platform according to different types and different permissions, and a public user may access a resource center in a browser or a mobile terminal, to obtain and make topic map resources and implement data sharing and exchange.

Described above are merely preferred embodiments of the present invention. It should be pointed out that many improvements and modifications may also be made for those of ordinary skill in the art without departing from the principle of the present invention, and these improvements and modifications shall fall into the protection scope of the present invention.

What is claimed is:

1. A national forest resources continuous inventory cloud platform, comprising:
   a perception layer device, comprising a tree diameter measuring sensor, an environmental sensor, a tilt sensor and a data collection terminal comprising a processor and a memory, configured to collect and obtain types and radial growth of sample trees and temperature and humidity environmental factors of an inventory sample plot, store and transmit collected information to a network layer device;
   the network layer device, comprising a communication relay apparatus, a communication base station, a communication receiving apparatus, and a device for completing optical fiber communication and Internet transmission, configured to gather data collected by the perception layer device, and transmit the data to a platform layer device;
   the platform layer device, comprising a computing server including a processor for building a computing resource pool, a storage server for building a storage resource pool, and a network server and a gateway for building a network resource pool, configured to provide computing, storage and network resources for the national forest resources continuous inventory cloud platform
   wherein the data collection terminal is configured to obtain server side information, connect to the communication relay apparatus and the tree diameter measuring sensor on survey site for restoration of sample trees on the inventory sample plot and collection, input and computing of data, configure and manage the communication relay apparatus and the tree diameter measuring sensor on site, receive device maintenance information by patrol personnel, survey changes of the inventory sample plot, and update devices;
   wherein the platform layer device is configured to
   summarize and count inventory sample plot data that are surveyed and collected by the data collection terminal and automatically collected by monitoring devices, check a logical relationship between survey cards, analyze overall sampling accuracy, count achievement reports, and provide survey form templates that the data collection terminal need to download and related data table configuration functions;
   supervise statuses of communication relay apparatuses and tree diameter measuring sensors arranged in all inventory sample plots, establish a grid management system for investigators and forest rangers, carry out patrol tasks for inventory sample plots, and confirm device maintenance and update results;
   carry out forest resources monitoring, ecosystem evaluation and important index assessment, and provide visual data display and sharing services based on basic data and evaluation results; and
   wherein the data collection terminal is configured to
   provide a user with interactive modes based on map operations, and provide basic map operation functions of translation, zoom-in, zoom-out, and hierarchical display, and advanced map operation functions comprising positioning, navigation, track collection, and photographing;

download survey forms comprising sample plot cards of previous national forest resources continuous inventory, an inventory sample plot database, and field survey record forms, as well as basic data and tables comprising satellite remote sensing images, inventory technical rules, dominant tree species maps, and unitary volume tables;

input basic information of the inventory sample plot, sample plot positioning and arrangement, survey records of sample plot factors, measured maps of fixed sample trees, tree height measurement records, forest disaster survey records, vegetation survey records, underwood survey records, natural regeneration survey records, sample plot change survey records during a review period, unformed afforestation land survey records, bamboo scale record charts, miscellaneous bamboo sample survey record charts, economic tree species survey record charts, and track photo recorded information;

measure types of mobile signals on site, select communication relay, test strengths of mobile signals or Beidou signals, and test a success rate of data transmission by communicating with a communication receiving end;

connect to the communication relay apparatus, set a data collection frequency, determine start time and start duration of the communication relay apparatus and the tree diameter measuring sensor, and estimate a theoretical monitoring time length according to a data collection frequency set by the user and battery capacity;

connect to the tree diameter measuring sensor, and after confirming the correct connection, input information of a surveyed sample tree, including a sample tree number, a standing tree type, a tally type, a tree species name, a tree species code, an early diameter at breast height, a forest layer, a cross-angle land type serial number, an azimuth angle, and a horizontal distance;

trigger background communication events of the tree diameter measuring sensor and the communication relay apparatus after the information of the surveyed sample tree is input, wherein the tree diameter measuring sensor transmits the device number and the survey input sample tree information to the communication relay apparatus for storage;

survey of all sample trees is completed, connect to the communication relay apparatus, obtain all tree diameter sensor data stored in the communication relay apparatus to the data collection terminal, compare the tree diameter sensor data with previous survey and surveillance data, check whether there are missing data, check abnormal change data, and check whether the tree diameter measuring sensor currently installed has low battery capacity;

when receiving an inventory sample plot patrol task issued by a provincial or national user, view patrol task information comprising the number of a patrolled inventory sample plot and main patrol content, submit patrol task personnel and a time schedule after acknowledgment, and receive provincial or national task completion acknowledgment information after patrol; and fill in patrol task completion after the inventory sample plot is patrolled on site, fill in update information factors for a device to be updated, or retest the inventory sample plot and arrange monitoring devices, and provide on-site patrol results and photos.

2. The national forest resources continuous inventory cloud platform according to claim 1, wherein the platform layer device is configured to configure the survey forms comprising sample plot cards of previous national forest resources continuous inventory, an inventory sample plot database, and field survey record forms, as well as the basic data and tables comprising satellite remote sensing images, inventory technical rules, dominant tree species maps, and unitary volume tables;

summarize tree diameter measuring sensor data returned by each communication relay apparatus through the receiving apparatus, and compute measured survey results of the inventory sample plot;

check a logical relationship between survey factors in national forest resources continuous inventory sample plot cards, comprising required item check, non-filling item check, dictionary item check, and logical relationship check;

count and generate overall sampling accuracy and eigenvalues of each monitored object, where the overall sampling accuracy and eigenvalues comprise at least a quantity of sample units, an average quantity of samples, variation coefficients, sampling accuracy, an estimated median value, an estimated interval, a sample plot restoration rate, and a sample tree restoration rate;

compute measured survey results of a standard plot after tally data of the inventory sample plot are obtained; and generate a statistical table of national forest resources continuous inventory achievements.

3. The national forest resources continuous inventory cloud platform according to claim 1, wherein the platform layer device is configured to inquire information of a communication relay apparatus, check an operating status of the communication relay apparatus, and configure a monitoring frequency, wake-up time and wake-up duration for the communication relay apparatus;

inquire device information of a tree diameter measuring sensor, check an operating status of the tree diameter measuring sensor, and configure wake-up time and wake-up duration for the tree diameter measuring sensor;

establish and manage accounts and permissions of investigators and forest rangers, delimit and divide management and protection grids for the investigators and the forest rangers, and establish a cooperative relationship between the investigators and the forest rangers;

discover loss of device statuses, determine a device fault inventory sample plot, find investigators and forest rangers who maintain the device fault inventory sample plot, initiate a device maintenance task, send the number and loss information of a status lost device to data collection terminals of the investigators and the forest rangers, and view a task progress in real time; and receive and summarize task reception and completion of the investigators and the forest rangers, and terminate the device maintenance task after completing the maintenance.

4. The national forest resources continuous inventory cloud platform according to claim 1, wherein the platform layer device is configured to generate a forest area, a forest stock, a forest structure and dynamic changes thereof according to the inventory sample plot survey and summarization results, and evaluate the forest area and quality changes;

generate a series of ecological evaluation indexes and indicators based on a model knowledge base;

comprehensively evaluate a status, quality, carbon sink, and functional benefits of an ecosystem in a national key strategy and social key concern region;

display national or provincial national forest resources continuous inventory achievement data in a big data visualization manner by using a three-dimensional real map and other interaction modes, and carry out comparative analysis and prediction analysis on the data for a long time series; and display data resources, services and applications owned and produced by the national forest resources continuous inventory cloud platform.

5. A national forest resources continuous inventory sample plot monitoring method, executed by the foregoing national forest resources continuous inventory cloud platform according to claim 1, the method comprising following steps:

(1) completing sample plot restoration and sample tree retest for an inventory sample plot, and arranging the perception layer device and the network layer device on the inventory sample plot;

(2) returning data at a set monitoring frequency by the data collection terminal in the inventory sample plot to the platform layer device, through the network layer device, and parsing and storing the collected data by the platform layer device;

(3) determining, by the platform layer device, according to the automatically collected data information, whether the perception layer device and the inventory sample plot change, and in response to the perception layer device and the inventory sample plot changing, entering step (4), in response to the perception layer device and the inventory sample plot not changing, entering step (5);

(4) issuing, by the platform layer device, a sample plot patrol task, confirming device maintenance and update results, keeping continuous monitoring on the inventory sample plots, and entering step (5);

(5) summarizing, by the platform layer device, survey data of sample trees in inventory sample plots, checking data logic and overall sampling accuracy, counting important index information of each inventory sample plot and monitored objects during a monitoring period, and generating achievement statistics reports;

(6) building, by the platform layer device, a model knowledge base, carrying out forest resources monitoring, ecosystem evaluation and key region evaluation, and providing visual data display and sharing services; and (7) determining, by the platform layer device, whether the monitoring is finished, and in response to the monitoring being finished, terminating the process, in response to the monitoring being not finished, executing step (2) to carry out continuous monitoring.

6. The national forest resources continuous inventory sample plot monitoring method according to claim 5, wherein specific operation steps in step (1) are as follows:

(1.1) after arriving at the inventory sample plot, completing the sample plot restoration, and testing a local signal by the data collection terminal to determine a type of a communication relay apparatus;

(1.2) arranging the communication relay apparatus at a central position of the sample plot, testing a connected status, and keeping the communication relay apparatus in a turn-on status after connection succeeds;

(1.3) connecting the data collection terminal to the communication relay apparatus, setting a data collection frequency, and determining start time and start duration of the communication relay apparatus and the tree diameter measuring sensor;

(1.4) selecting a sample tree diameter measuring position and fixing the tree diameter measuring sensor to the sample tree to be measured;

(1.5) starting the tree diameter measuring sensor and connecting the data collection terminal to the tree diameter measuring sensor;

(1.6) pulling a pull rope out from a pull wire outlet of the tree diameter measuring sensor, and buckling the pull rope into an anti-dismantle pull wire fixing port after winding the sample tree for one circle;

(1.7) checking whether a measured value about the diameter of the sample tree is shown in the data collection terminal, and in response to no measured value being shown, pressing the start button of the tree diameter measuring sensor to ensure that the pull rope is pulled again in a start status for mounting;

(1.8) clicking to connect the tree diameter measuring sensor, and inputting a tree species and a tally type;

(1.9) implementing communication between the tree diameter measuring sensor and the communication relay apparatus, to transmit input tally and battery capacity information to the communication relay apparatus for storage;

(1.10) performing clock synchronization on the tree diameter measuring sensor and the communication relay apparatus, and obtaining start time and start duration of the tree diameter measuring sensor;

(1.11) enabling the tree diameter measuring sensor that is not in communication connection to automatically enter a dormant status after a fixed interval;

(1.12) repeating steps (1.4-1.11) to complete mounting of tallies and tree diameter measuring sensors for all sample trees in the inventory sample plot;

(1.13) returning, by the communication relay apparatus, the stored information to the communication receiving apparatus through a base station, and summarizing the information into a network server on the platform layer; and (1.14) disconnecting the data collection terminal and the communication relay apparatus, and enabling the communication relay apparatus to automatically enter a dormant status after a fixed interval.

7. The national forest resources continuous inventory sample plot monitoring method according to claim 5, wherein specific operation steps in step (2) are as follows:

(2.1) regularly starting the communication relay apparatus according to a set wake-up time, and accessing the network server on the server side through the base station, to obtain next wake-up time and wake-up duration;

(2.2) regularly starting the tree diameter measuring sensor according to the set wake-up time, and measuring the sample tree to be measured to obtain a measured diameter value and a tilt sensor value;

(2.3) in response to the tilt sensor value exceeding a specified threshold, determining that the current sample tree is a fallen tree, and updating the tally type to be a fallen tree;

(2.4) reading diameter changes of the sample tree in a continuous period, and updating the tally type to be a dead standing tree when the diameter of the sample tree is constant or regularly reduced beyond a predetermined interval;

(2.5) connecting the tree diameter measuring sensor with the communication relay apparatus to transmit information about the diameter of the standing tree, a type of the standing tree, and battery capacity;

(2.6) performing clock synchronization on the tree diameter measuring sensor and the communication relay apparatus to obtain next wake-up time and wake-up duration, and entering a dormant status after success;

(2.7) receiving, by the communication value relay apparatus, data from the tree diameter measuring sensor for storing, computing a difference from the previous measured data, and returning a difference result according to a coding order of the tree diameter measuring sensor; and (2.8) returning, by the communication relay apparatus, the stored information to a communication receiving apparatus through the base station, and summarizing the information into the network server on the platform layer.

8. The national forest resources continuous inventory sample plot monitoring method according to claim 5, wherein specific operation steps in step (4) are as follows:

(4.1) completing identity verification of a user in a competent authority on the user layer for login;

(4.2) designating investigators and forest rangers for all inventory sample plots;

(4.3) obtaining working statuses of the communication relay apparatuses arranged in all the inventory sample plots within the last wake-up time period;

(4.4) checking whether the statuses of all the communication relay apparatuses are normal, and in response to the statuses of all the communication relay apparatuses being normal, executing step (4.11), in response to the statuses of all the communication relay apparatuses being not normal, executing step (4.5);

(4.5) issuing a patrol task to a forest ranger in a region where the status of the communication relay apparatus is abnormal, to require on-site verification on the status of the inventory sample plot;

(4.6) receiving patrolled inventory sample plot objects and arriving at a designated sample plot by the forest ranger;

(4.7) feeding back, by the forest ranger, site conditions of the designated inventory sample plot;

(4.8) determining, according to the feedback information in step (4.7), whether an investigator needs to be dispatched to update devices or resurvey, and in response to an investigator needing to be dispatched to update devices or resurvey, executing step (4.9), in response to an investigator not needing to be dispatched to update devices or resurvey, executing step (4.10);

(4.9) carrying a communication relay apparatus and a tree diameter measuring sensor by the investigator to the inventory sample plot, resurveying the sample plot according to step (1), and returning new data;

(4.10) determining a status of the current inventory sample plot according to the returned data, and updating sample plot and sample tree information;

(4.11) obtaining working statuses of tree diameter measuring sensors and tilt sensors arranged in all the inventory sample plots within the last wake-up time period;

(4.12) determining whether the statuses of all the tree diameter measuring sensors and tilt sensors are normal, and in response to the statuses of all the tree diameter measuring sensors and tilt sensors being normal, executing step (4.13), in response to the statuses of all the tree diameter measuring sensors and tilt sensors being not normal, executing step (4.5); and (4.13) reading diameter changes of the sample tree in two successive periods, and comparing whether a difference change exceeds a normal growth range of diameter growth rates of standing trees, and in response to a difference change exceeding a normal growth range of diameter growth rates of standing trees, determining that the current data are abnormal, and executing step (4.5), in response to a difference change not exceeding a normal growth range of diameter growth rates of standing trees, terminating the process.

9. The national forest resources continuous inventory sample plot monitoring method according to claim 5, wherein specific operation steps in step (5) are as follows:

(5.1) logging in to complete identity verification of a user;

(5.2) using configured survey form templates and basic data tables to store previous inventory sample plot cards for downloading and use by the mobile data collection system;

(5.3) summarizing the survey information received by the network server on the platform layer;

(5.4) logically checking the recorded information summarized into the sample plot survey achievement database, determining whether there is a logical error, and in response to there being a logical error, notifying an error survey unit to make corrections, and submitting the corrected information again by using the mobile data collection system until there is no logic error;

(5.5) computing measured result data of each inventory sample plot according to tree species and a unitary volume table;

(5.6) counting sampling accuracy and eigenvalues of monitored objects of current national forest resources continuous inventory, interpreting whether the sampling accuracy meets requirements, and in response to the sampling accuracy not meeting the requirements, notifying the survey unit to make corrections, and submitting the corrected sampling accuracy again by using the mobile data collection system until the accuracy requirements are met; and (5.7) computing and generating important index information of each inventory sample plot and monitored objects during a monitoring period, and generating achievement statistics reports.

10. The national forest resources continuous inventory sample plot monitoring method according to claim 5, wherein specific operation steps in step (6) are as follows:

(6.1) logging in to complete identity verification of a user;

(6.2) selecting any monitoring year or monitoring years for comparative analysis;

(6.3) evaluating ecological functions and dynamic changes of a forest by using landscape ecology and process mechanism model methodology;

(6.4) selecting an analysis region through administrative division selection, interactive map selection, and custom ecological function region selection, and carrying out forest resources evaluation and ecosystem evaluation;

(6.5) displaying continuous inventory achievement data in a big data visualization manner by using a three-dimensional real map and other interaction modes, and carrying out comparative analysis and prediction analysis on the data for a long time series; and (6.6) displaying data resources, services and applications owned by the platform according to different types and different permissions, and accessing a resource center in a browser or a mobile terminal by a user to obtain and make topic map resources and implement data sharing and exchange.

\* \* \* \* \*